United States Patent [19]
Nishimura

[11] Patent Number: 5,570,362
[45] Date of Patent: Oct. 29, 1996

[54] SYSTEM FOR TRANSFERRING VARIABLE LENGTH CELLS UNDER ATM

[75] Inventor: Takashi Nishimura, Kawasaki, Japan

[73] Assignee: Fujitsu Limited, Kanagawa, Japan

[21] Appl. No.: 389,284

[22] Filed: Feb. 16, 1995

[30]  Foreign Application Priority Data

Mar. 16, 1994 [JP] Japan ..................... 6-045423

[51] Int. Cl.$^6$ .................................... H04L 12/56
[52] U.S. Cl. .............................. 370/60.1; 370/82
[58] Field of Search .............. 370/60, 60.1, 82, 370/83, 94.2

[56] References Cited

U.S. PATENT DOCUMENTS

| | | | |
|---|---|---|---|
| 4,536,872 | 8/1985 | Lahti | 370/82 |
| 4,688,035 | 8/1987 | Gray et al. | 370/82 |
| 4,956,839 | 9/1990 | Toril et al. | 370/60 |
| 5,214,642 | 5/1993 | Kunimoto et al. | 370/60 |
| 5,386,412 | 1/1995 | Park et al. | 370/82 |
| 5,394,398 | 2/1995 | Rau | 370/60.1 |

FOREIGN PATENT DOCUMENTS 2195756  8/1990  Japan .

*Primary Examiner*—Benedict V. Safourek

[57] ABSTRACT

A system for transferring variable length cells in an ATM, wherein an ATM layer composes variable length ATM cells by an n-octet header and an ATM cell payload of a length of a whole multiple m (m≧1) of the minimum unit of transfer, using as a minimum unit of transfer a length of n (8≧n≧6) octets, stores in the payload the information generated from a higher layer adjusted to a length of a whole multiple of the minimum unit of transfer, and sets in the header data indicating the length of the variable length cell. The adjustment is performed by a higher ATM adaptation layer which adds ineffective data to the SAR-protocol data unit (SAR-PDU) including the header and trailer so the SAR-PDU becomes a whole multiple of the n-octets. A region provided in the trailer of the SAR-PDU in the layer to indicate the length of the effective data in the payload is set with the number of octets remaining after division of the number of octets of the effective data in the payload by 44. By this, it is possible to make efficient use of transmission channels by maintaining the user information, generated in bursts of information, at a constant, optimal length.

36 Claims, 17 Drawing Sheets

Fig. 2A PRIOR ART

| 4 OCTETS | USER INFORMATION LENGTH | 4 OCTETS |
|---|---|---|
| CS-PDU HEADER | CS-PDU PAYLOAD | CS-PDU TRAILER |

Fig. 2B PRIOR ART

| 2 OCTETS | 44 OCTETS | 2 OCTETS |
|---|---|---|
| SAR-PDU HEADER | SAR-PDU PAYLOAD | SAR-PDU TRAILER |

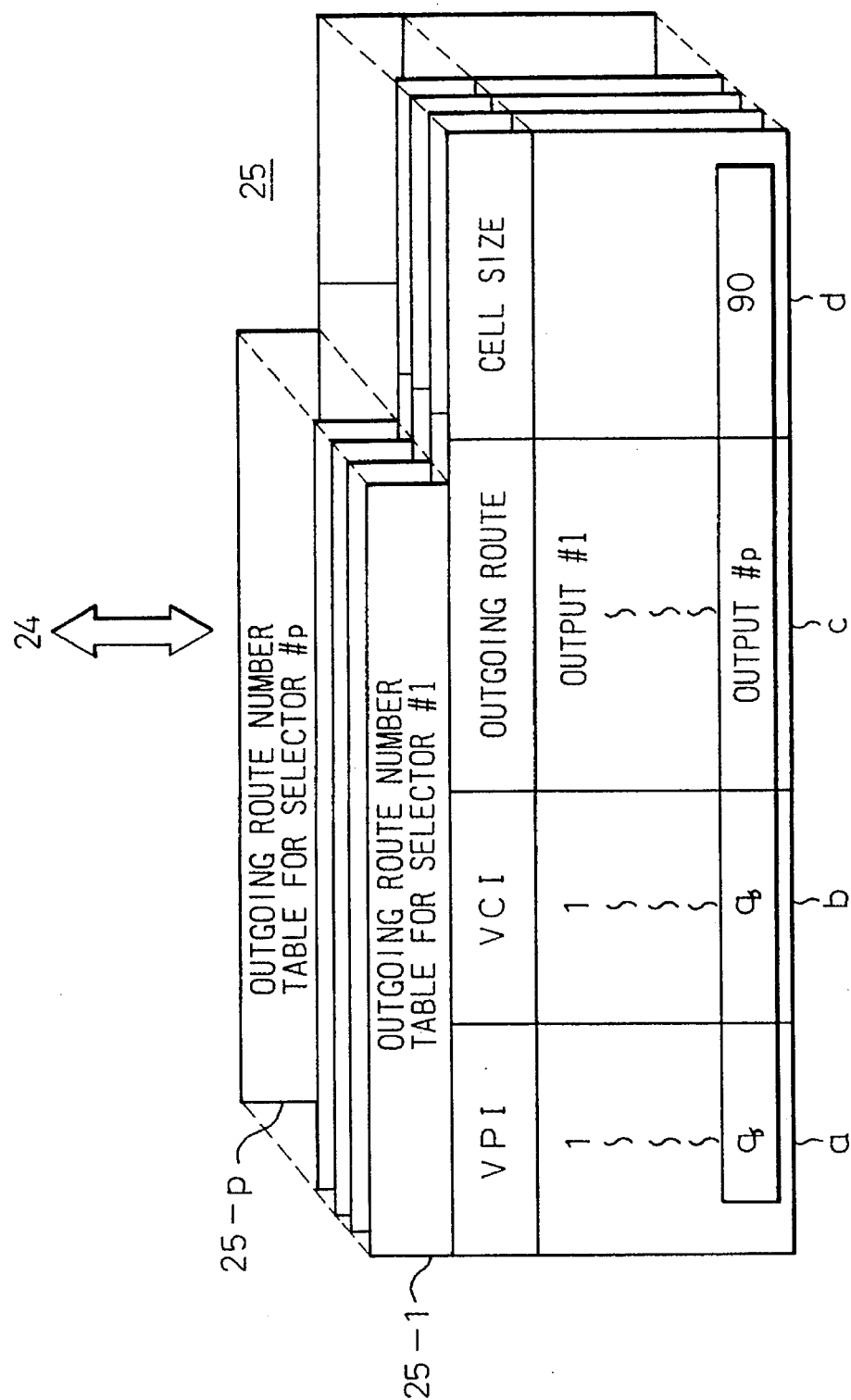

IF BOUNDARY IS DISCRIMINTED, CELL IS TRANSFERRED TO ATM LAYER
(LMM LAYER)

SYSTEM FOR TRANSFERRING VARIABLE LENGTH CELLS UNDER ATM

BACKGROUND OF THE INVENTION

1. Field of the Invention

The present invention relates to a system for transferring variable length cells under an asynchronous transfer mode (ATM), a switch apparatus handling variable length cells, and an exchange handling variable length cells.

In recent years, there have been much research and development conducted on ATM technology in view of its suitability for large volume, high speed data transmission and exchange. Fixed length cells of 53 bytes have been proposed as the standard unit for transfer in ATM systems, but when such fixed length cells are used, it is not possible to make efficient use of the transmission band due to the high proportion of the control data. Accordingly, improvement has been desired.

2. Description of the Related Art

In the conventional mode of ATM transfer, the exchange performs high speed switching under control by hardware, so fixed length cells are used as the units of transfer. By using fixed length cells as the unit of transfer, the following advantages are obtained in an ATM system: That is, since hardware is used for controlling the transfer, despite the fact that the ATM is a label multiplex mode, it is possible to transfer more than the so-called H4 channel (about 135 Mbit/sec) of user information at the user-network interface (UNI). Further, due to the label multiplex mode, the user information can be transferred at any speed.

As explained later with reference to the drawings, however, in the fixed length ATM transfer mode, a header and trailer are coded in each layer and accommodated in the ATM cell payload. In this case, since a 5 octet header field is allocated in each fixed length ATM cell, a large header field is required for transferring user information and therefore the efficiency of transmission is poor.

Further, since the transfer capacity of each cell is 44 octets of information, even if the data to be transferred is less than 44 octets, it is necessary to create an empty region (ineffective octets) in the cell to bring the length to 53 octets for the transfer. This is uneconomical.

Taking as an example the case of generation of 88 octets (oct) of user information at a higher layer, the information becomes the convergence sublayer (CS)—protocol data unit (PDU) payload as it is. A 4-octet CS-PDU header and CS-PDU trailer are added before and after the same to bring the total length to 96 octets. When this is transferred to the segmentation and reassembly (SAR) sublayer, it is successively disassembled into 44 octet SAR-PDU payloads. In this example, 44 octets of effective information of the CS layer are loaded in the first two SAR-PDU payloads. The third SAR-PDU payload, however, is loaded with only 8 octets of effective information. The remaining 36 octets (44−8=36) of space is loaded with ineffective information. At the ATM layer, these three SAR-PDU's are used to make three ATM cells which are then transmitted over the transmission line. In this way, when transferring user information, there is the problem that the finally transferred amount of data becomes considerably larger than the amount of the original user information.

Further, when transferring voice information using fixed length cells as in the past, it is demanded to transfer the information once every 125 μsec in periods when voices are being transmitted due to the nature of voice information. In this case, when transferring 53 octet (byte) fixed length cells every 125 μsec, there is the problem that transmission is not possible with a low bit rate channel (for example, 1.5 Mbps channel). A channel rate of at least 3.4 Mbps is required.

SUMMARY OF THE INVENTION

Accordingly, the present invention has as its object the provision of a system for transferring variable length cells in an ATM which enables the efficient use of transmission channels and switches by maintaining the user information, generated in bursts of information, at a constant, optimal length and a variable length cell ATM switch and ATM exchange relating to the same.

That is, the present invention has as its object to provide a system for transferring ATM cells which enables the cell length to be changed adaptively in accordance with the amount of the burst-like user information.

To attain the above object, the present invention composes variable length ATM cells by an n-octet header and an ATM cell payload of a length of a whole multiple m ($m \geq 1$) of the minimum unit of transfer, using as a minimum unit of transfer a length of n ($8 \geq n \geq 6$) octets. In the payload is stored the information generated from a higher layer adjusted to a length of a whole multiple of the minimum unit of transfer. Data indicating the length of the variable length cell is set in the header. The length is adjusted by adding ineffective data (dummy data) at the higher ATM adaptation layer so that the SAR-PDU, including a header and trailer, becomes a whole multiple of n-octets. In the region in the trailer indicating the effective information in the payload, the number of octets remaining after dividing the number of octets of the effective data by 44 is set.

BRIEF DESCRIPTION OF THE DRAWINGS

The above object and features of the present invention will be more apparent from the following description of the preferred embodiments with reference to the accompanying drawings, wherein:

FIGS. 2A and 2B are views of the data format of two layers in an AAL, FIG. 10 is a view of the configuration of an outgoing route number discrimination table.

DESCRIPTION OF THE PREFERRED EMBODIMENTS

Before describing the embodiments of the present invention, the related art and the disadvantages therein will be described with reference to the related figures.

As mentioned earlier, in the conventional mode of ATM transfer, the exchange performs high speed switching under control by hardware, so fixed length cells are used as the units of transfer. By using fixed length cells as the unit of transfer, the following advantages are obtained in an ATM system: That is, since hardware is used for controlling the transfer, despite the fact that the ATM is a labeled multiplexing mode (LMM), it is possible to transfer more than the so-called H4 channel (about 135 Mbit/sec) of user information at a UNI. Further, due to the labeled multiplexing mode, the user information can be transferred at any speed.

Figure 1:
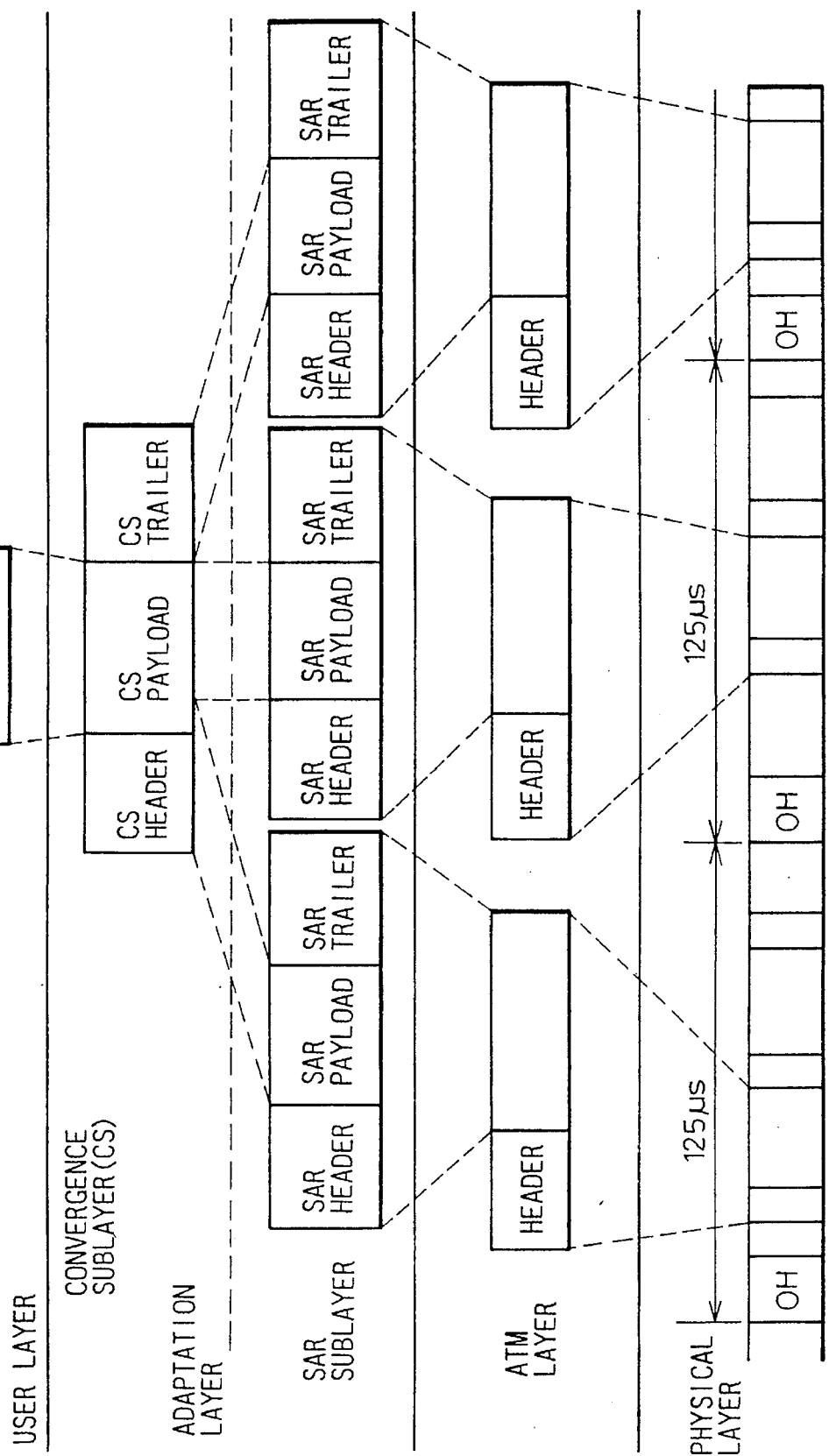
FIG. 1 is an explanatory view of the layers for loading information in ATM cells in the related art.

FIG. 1 is an explanatory view of the layers for loading information in ATM cells in the related art. In the figure, when user information is generated at a user layer (higher layer), it is transferred to the ATM adaptation layer (AAL). The ATM adaptation layer (AAL) is constructed of two sublayers: a convergence sublayer CS for checking for errors in the data and for verifying the correctness of the corrections and other data and a segmentation and reassembly (SAR) sublayer for segmentation and reassembly of the cells. In the convergence sublayer (CS), the user information is accommodated in the payload. A CS header and CS trailer are added before and after the same, respectively. At the SAR sublayer, the information composed at the convergence sublayer (CS) is disassembled into fixed lengths and the disassembled content is used as the SAR payload. An SAR header and SAR trailer are added before and after the same.

An ATM layer is located below the ATM adaptation layer (AAL). The fixed length data (48 octets) composed at the SAR sublayer is used as the payload of the ATM cell. By adding a header to this (5 octets), an ATM cell (53 octets) is prepared. ATM cells are multiplexed at a physical layer for transmission through a high speed transmission channel and are transmitted together with an overhead (OH) including administrative information unique to the transmission channel.

FIGS. 2A and 2B are views of the data format of the two sublayers in the ATM adaptation layer (AAL). In the initial convergence sublayer (CS), as shown in FIG. 2A, convergence sublayer protocol data units (CS-PDU) are composed from the higher layer user information. A 4-octet CS-PDU header and CS-PDU trailer are added before and after each of the same. Further, this sublayer has the function of verifying the correctness of the data units in the CS-PDU's received from the higher sublayer (SAR) and transferring them to the higher layer. At the SAR sublayer, as shown in FIG. 2B, SAR protocol data units (SAR-PDU) are composed. These are each comprised of a 44-octet SAR-PDU payload plus a 2-octet SAR-PDU header and SAR-PDU trailer added before and after the same. The user information is deassembled into cell-unit units of data in this way. These units of data from the lower layer are transferred to the CS layer.

As explained above, in the fixed length ATM transfer mode, a header and trailer are coded in each layer and accommodated in the ATM cell payload. In this case, since a 5-octet header field is allocated in each fixed length ATM cell, a large header field is required for transferring user information and therefore the efficiency of transmission is poor.

Further, since the transfer capacity of each cell is 44 octets of information, even if the data to be transferred is less than 44 octets, it is necessary to create an empty region (ineffective octets) in the cell to bring the length to 53 octets for the transfer, which is uneconomical.

Figure 3:
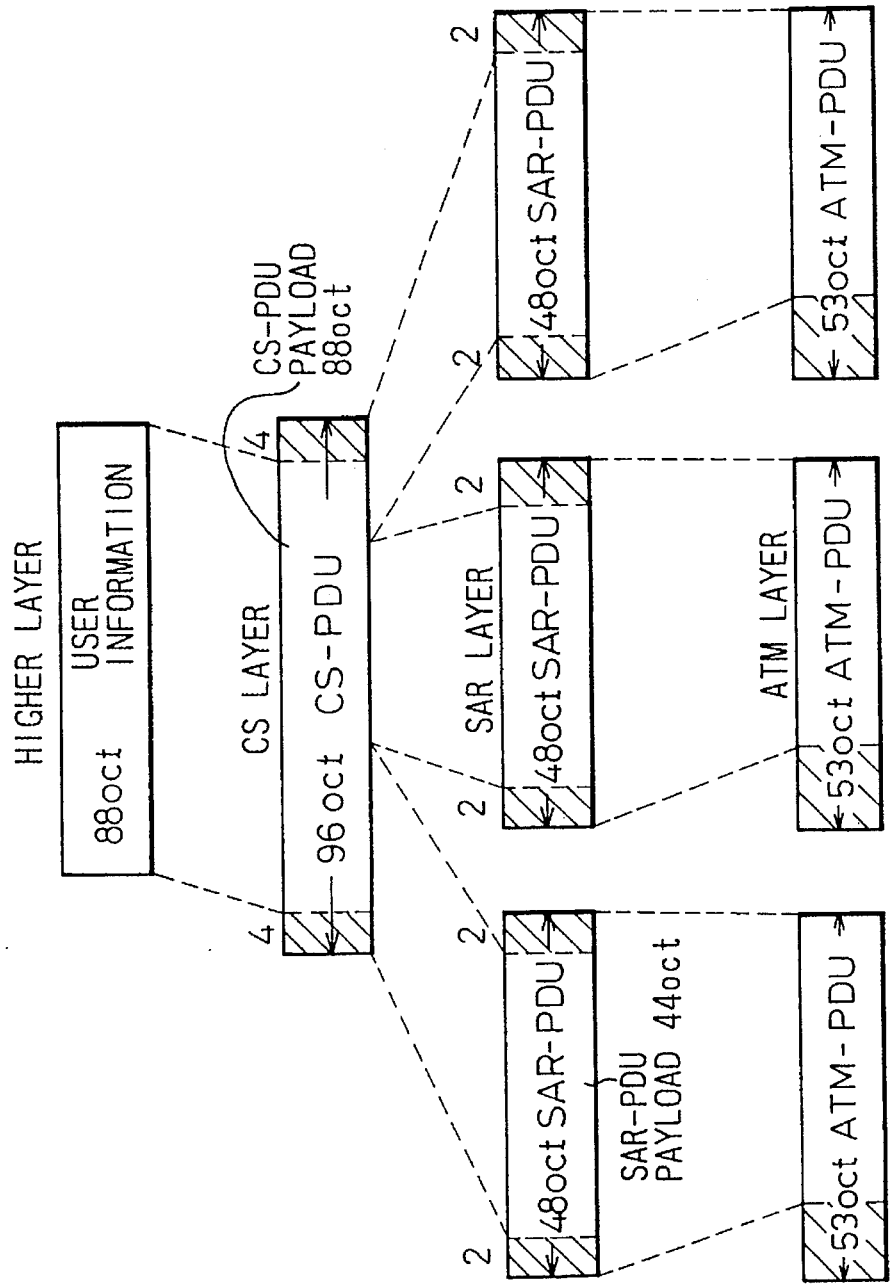
FIG. 3 is a view for explaining the problems in the case of use of fixed length cells.

FIG. 3 is a view explaining the problem in the case of using fixed length cells. Take as an example the case of generation of 88 octets (oct) of user information at a higher layer. The information becomes the CS-PDU payload as it is. A 4-octet CS-PDU header and CS-PDU trailer are added before and after the same to bring the total length to 96 octets. When this is transferred to the SAR sublayer, it is successively disassembled into 44 octet SAR-PDU payloads. In this example, 44 octets of effective information of the CS layer are loaded in the first two SAR-PDU payloads. The third SAR-PDU payload, however, is loaded with only 8 octets of effective information. The remaining 36 octets (4−8=36) of space is loaded with ineffective information. At the ATM layer, these three SAR-PDU's are used to make three ATM cells which are then transmitted over the transmission line. In this way, when transferring user information, there is the problem that the finally transferred amount of data becomes considerably larger than the amount of the original user information.

Further, when transferring voice information using fixed length cells as in the past, it is demanded to transfer the information once every 125 μsec in periods when voices are being transmitted due to the nature of voice information. In this case, when transferring 53 octet (byte) fixed length cells every 125 μsec, there is the problem that transmission is not possible with a low bit rate channel (for example, 1.5 Mbps channel). A channel rate of at least 3.4 Mbps is required.

The present invention provides a system for transferring variable length cells in an ATM which enables the efficient use of transmission channels and switches by maintaining the user information, generated in bursts of information, at a constant, optimal length and a variable length cell ATM switch and ATM exchange relating to the same.

Figure 4A:
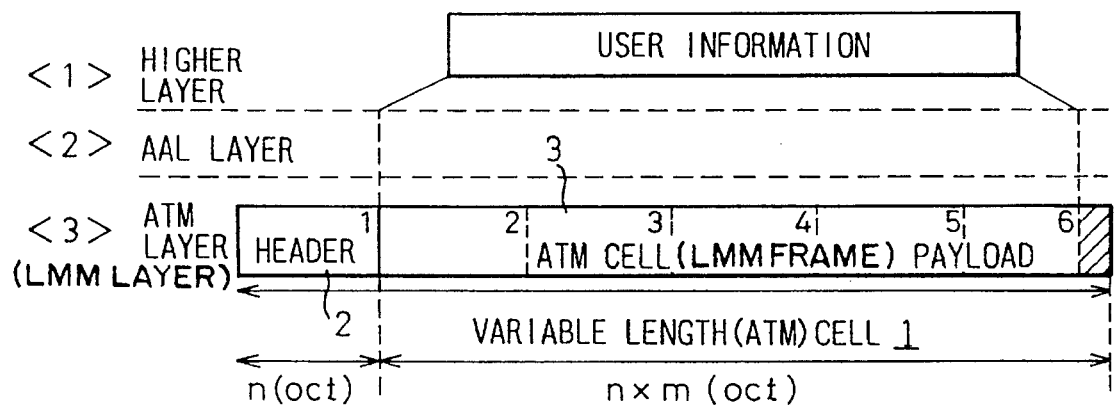
FIGS. 4A and 4B are views of the basic configuration of the present invention.
Figure 4B:
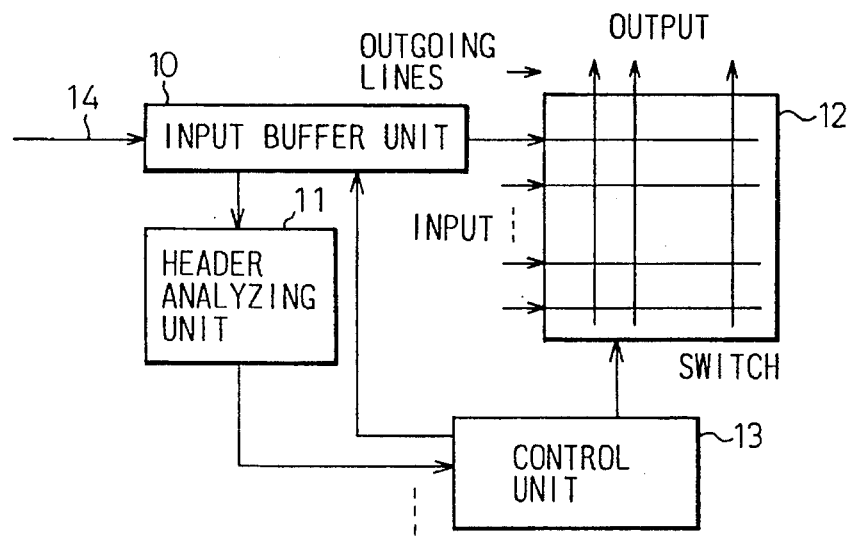

FIGS. 4A and 4B are views of the basic configuration of the present invention. That is, FIG. 4A is a view of the configuration of a variable length ATM cell according to the present invention, while FIG. 4B is a view of the basic configuration of an ATM switch.

In FIG. 4A, 1 is a variable length ATM cell, 2 is a header, 3 is an ATM cell payload, 10 is an input buffer unit, 11 is a header analysis unit, 12 is a switch, and 13 is a control unit.

The present invention does not use the unit of an ATM cell as the unit of switching in control by hardware in the ATM exchange as in the past, but uses a unit of the length of the header of the variable length ATM cell, which differs from the header of a fixed length ATM cell, that is, n-octets (8≧n≧6). This is used as the minimum unit of transfer. That is, the length of the payload of the variable length ATM cell is made a whole multiple (m, where $m \geq 1$) of n-octets. The adaptation layer, ATM layer, and physical layer perform suitable processing for assembly and disassembly of such variable length ATM cells and the transmission of the variable length ATM cells.

Referring to FIG. 4A, when information, of any length, is generated as user information (image, data, voice, etc.) in a higher layer, as shown by <1>, it is transferred to the ATM adaptation layer (AAL) as a single block of information, regardless of its length. There, a corresponding header and trailer are added and a data unit of the length shown by <2> (shown by broken lines) is composed. The data unit of the length shown in <2> is used to compose the variable length ATM cell 1 shown by <3> in the ATM layer. In this variable length ATM cell 1, the header 2 is composed of the minimum unit of transfer, that is, n-octets (oct). In the ATM cell payload 3, the data unit of the ATM adaptation layer (AAL) is segmented into a multiple m ($m \geq 1$) of n-octets. If there is any remaining data less than n-octets, ineffective octets (portion shown by hatching in <3> of FIG. 4A) are added to bring the total to n-octets. Accordingly, the overall length of the variable length ATM cell 1 becomes $n \times (m+1)$. Therefore, the minimum cell length becomes $n \times 2$ (including header). On the other hand, the maximum length is only limited by the length of the header. This is because if the header is short, the amount of data which can be written in it becomes smaller and the amount of information for indicating the maximum cell length becomes smaller.

The header 2 of the variable length ATM cell 1 of the present invention includes, like with the header of a fixed length ATM cell, virtual path identifier (VPI), virtual channel identifier (VCI), and other information and also, newly, a "row of cell count" (RCC) part indicating the length of the cell. In this RCC part, the multiple (m+1) of the minimum unit of transfer is set. This RCC information is used for control of switching and for various checks.

Referring to FIG. 4B, when a variable length ATM cell 1 of the configuration shown in FIG. 4A is received from an incoming line 14, it is held temporarily in the input buffer 10. The header 2 is analyzed by the header analyzing unit 11. The header analyzing unit 11 reads the VPI, VCI, and RCC and supplies the same to the control unit 13. The control unit 13 discriminates the appropriate outgoing line in accordance with the VPI and VCI, sets the path for connection of the incoming line and outgoing line for the cell in the switch 12, sets the exact time for enabling passage of the variable length ATM cell, comprised of the minimum unit length times (m+1), identified by the RCC, and holds that state. During that time, it reads out the variable length ATM cell 1 from the input buffer unit 10 and outputs it through the switch 12 to the destination outgoing line. Note that cells are input into each outgoing line from one of a number of incoming lines at different times.

In the following preferred embodiment of the invention, an explanation will be made of the case of 6 octets (n=6 in the configuration of FIG. 4A) as the minimum unit of transfer of the variable length ATM of the present invention. Note that the operation is the same even if n=7 octets or n=8 octets.

Figure 5:
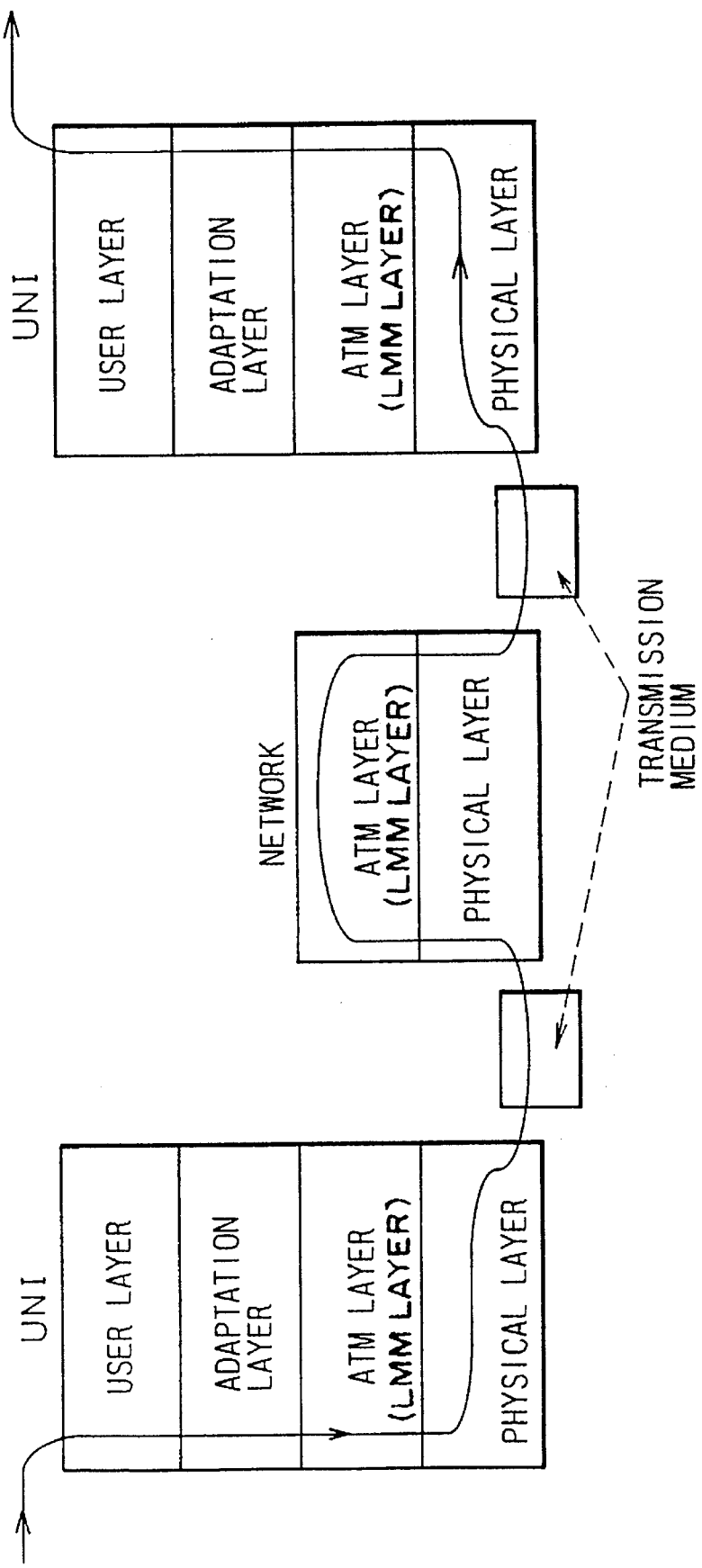
FIG. 5 is a view of the configuration of a layer according to the present invention.

FIG. 5 is a view of the configuration of a layer according to the present invention.

In the present invention, as shown in FIG. 5, data input to a user layer in one user network interface (UNI) is transferred through its adaptation layer and ATM layer for processing at the same and then is transmitted by the physical layer to a transmission medium. At the network, it is processed by the physical layer and ATM layer and again sent to a transmission medium through the physical layer. The data is then subject to successive higher layer processing from the physical layer of another UNI and is output from the user layer of that UNI as a reproduction of the original data.

User functions are performed at these user layers, while the functions of flow control and error control, absorption of jitter during cell transfer, and segmentation and reassembly of cells are performed at the adaptation layers. At the ATM layers, functions of cell transfer (VPI/VCI routing and multiplexing) and cell composition and extraction are performed. Further, at the physical layers, functions of matching the cell flow rates, cell synchronization, header error control (HEC), sequence confirmation and correction, bit timing control, and control of the physical medium are performed.

Next, an explanation will be made of the configuration of the data at the different layers according to the present invention.

Figure 6:
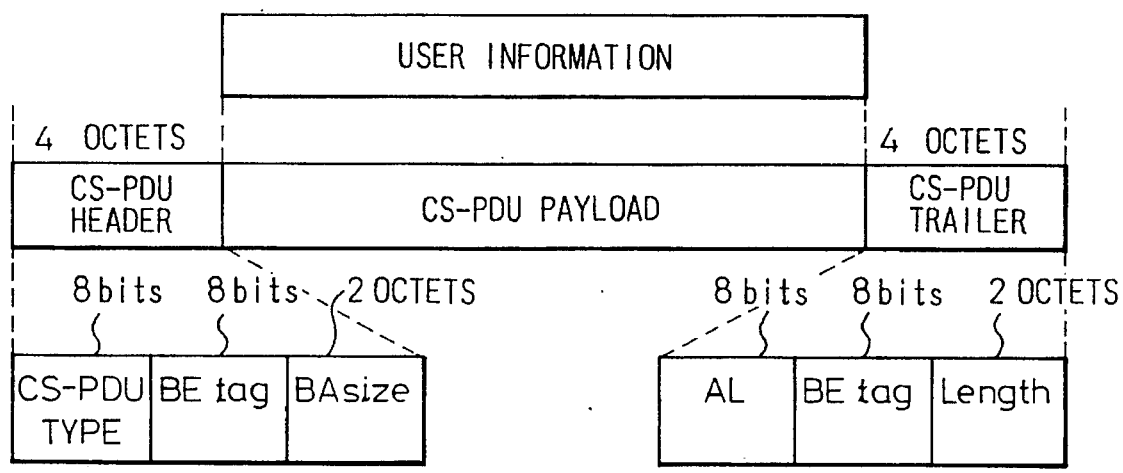
FIG. 6 is a view of the format of a CS-PDU in a CS.

The adaptation layer shown in FIG. 5 is comprised of a convergence sublayer (CS) and SAR sublayer in the same way as in the past. FIG. 6 shows the format of a data unit in a CS, that is, a CS-PDU, while FIG. 7 shows the format of a data unit in an SAR, that is, an SAR-PDU.

The format of the CS-PDU shown in FIG. 6 is based on the specification of IEEE 802.6. The user information of the higher layer is accommodated in the payload of the CS-PDU as it is. A 4-octet CS-PDU header is added in front of it and a 4-octet CS-PDU trailer after it. The content of each is prescribed by the IEEE specification as shown in the figure.

Figure 7:
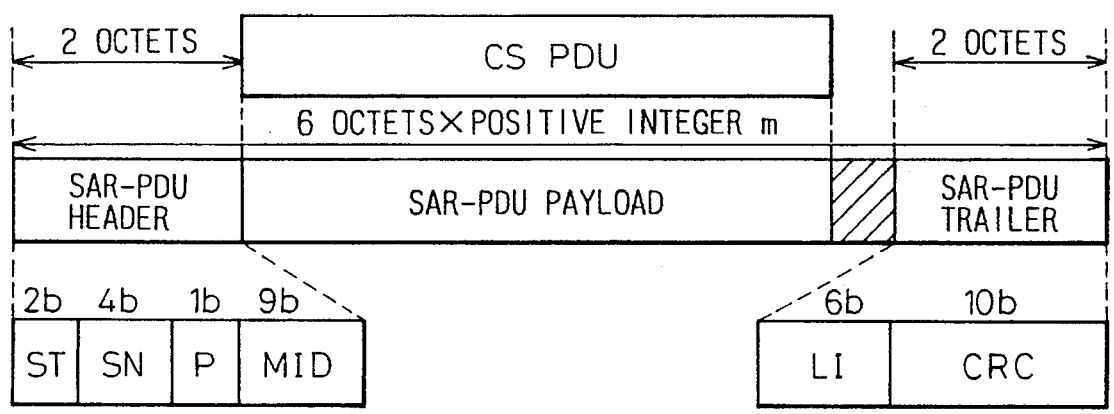
FIG. 7 is a view of the format of an SAR-PDU in a SAR sublayer.

FIG. 7 shows the format of the data unit handled at the layer below the AAL, that is, the SAR sublayer, in the case of a CS-PDU having the format of FIG. 6.

In a conventional SAR sublayer handling fixed length cells, the CS-PDU was broken down and assembled in fixed lengths (48 octets). In the SAR sublayer of the present invention, however, it is not broken down into fixed lengths. Rather, as shown in FIG. 7, the CS-PDU as a whole is accommodated as a payload by the SAR sublayer and given a 2-octet SAR-PDU header before it and SAR-PDU trailer after it. The length of the payload of the SAR-PDU is adjusted so that the overall length of data becomes a whole multiple of the minimum unit of transfer, that is, 6 octets (n=6).

In the case of a length not divisible by 6 octets, all of the CS-PDU is accommodated in the SAR-PDU payload, then the payload is adjusted in length by adding ineffective data to the finally remaining data (remaining data of length of 1 to 5 octets) to bring it to 6 octets. In the example of FIG. 7, the ineffective data shown by the hatching is added to the SAR-PDU payload. A maximum of just 5 octets of ineffective data are added, which is much less compared with a system such as with the conventional fixed length ATM cells, where a maximum of 47 octets of ineffective data could be added. As a result, the overall length of the SAR-PDU becomes 6 octets multiplied by a positive integer m. Note that the above "47 octets" of ineffective data is derived from the fact that it takes 48 octets to send even the minimum 1 octet of data.

The SAR-PDU header and trailer have the same formats as in the case of the fixed length cell, as shown in detail in FIG. 7, but differ on the following point. That is, a length indication (LI) showing the length of the effective information in the payload is provided in the trailer for showing the boundary between the effective data and ineffective data.

Since only 6 bits are allowed for this, it cannot indicate the length of effective information in the payload of the SAR-PDU if over 63 octets. Therefore, in the present invention, when the length of the effective information is over 44 octets, the LI shows the value of the remainder after division of the length of the payload by 44 octets. Due to this, it is possible to show the length of effective information in the SAR-PDU payload even in the case of a variable length of information of over 44 octets.

Next, an explanation will be made of the configuration of the variable length ATM cell in the ATM layer according to the present invention (hereinafter simply referred to as an ATM cell).

Figure 8A:
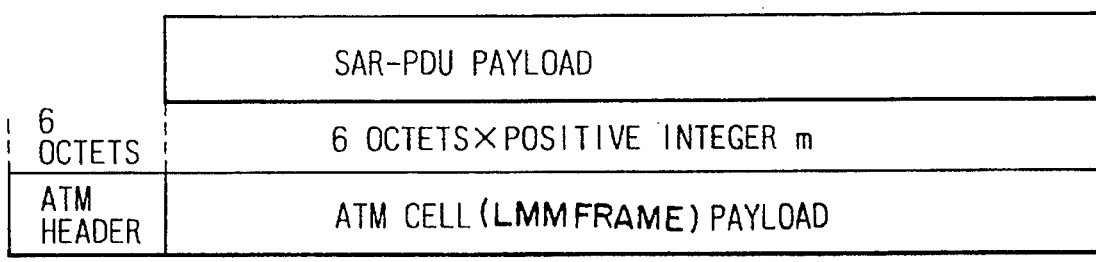
FIGS. 8A and 8B are views of the configuration of an ATM cell and ATM cell header in an embodiment.
Figure 8B:
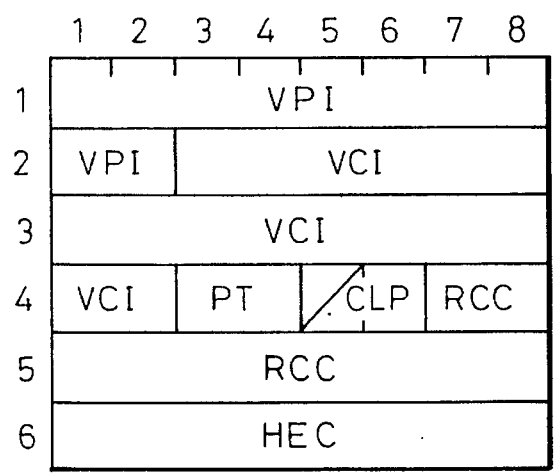

FIGS. 8A and 8B are views of the configuration of the ATM cell and ATM cell header in this embodiment. As shown in FIG. 8A, the ATM cell holds the ATM cell payload all of the SAR-PDU (including header and trailer) of the format shown in FIG. 7 and adds to the front of the same a 6-octet ATM header. The ATM payload, as explained with reference to FIG. 7, accommodates data of a whole multiple (m) of 6 octets.

The 6-octet ATM header has the configuration shown in FIG. 8B. That is, it shows the VPI by 10 bits, that is, the first octet and the first two bits of the second octet, and shows the VCI by a total 16 bits, that is, the third to eighth bits of the second octet, the third octet, and the first two bits of the fourth octet. The third and fourth bits of the fourth octet are used to show the payload type (PT) and the fifth and sixth bits the cell loss priority (CLP). After this, the RCC is provided expressed by a total of 10 bits consisting of the seventh and eighth bits of the fourth octet and the fifth octet. In the case of the example shown in FIG. 8A, a binary value of the integer m (not including header) or m+1 (including header) is set in this portion (RCC). After this is set a HEC generated using the generator polynomial shown in FIG. 8B for checking for data errors in the header.

Note that this explanation was made with reference to a length of RCC of 10 bits since the example was one of a minimum unit of transfer of 6 octets. When desiring a longer RCC, it is possible to make the header length 7 octets and add a further 1 octet to the region storing the RCC (total 18 bits). In this case, it is necessary to make the minimum unit of transfer 7 bits and make the length of the ATM payload a whole multiple of 7 octets as well.

ATM cells with the configurations shown in FIGS. 8A and 8B are multiplexed and transmitted on lines and then switched in a switch mechanism to one among the plurality of outputs corresponding to the destination addresses of the ATM cells.

Figure 9:
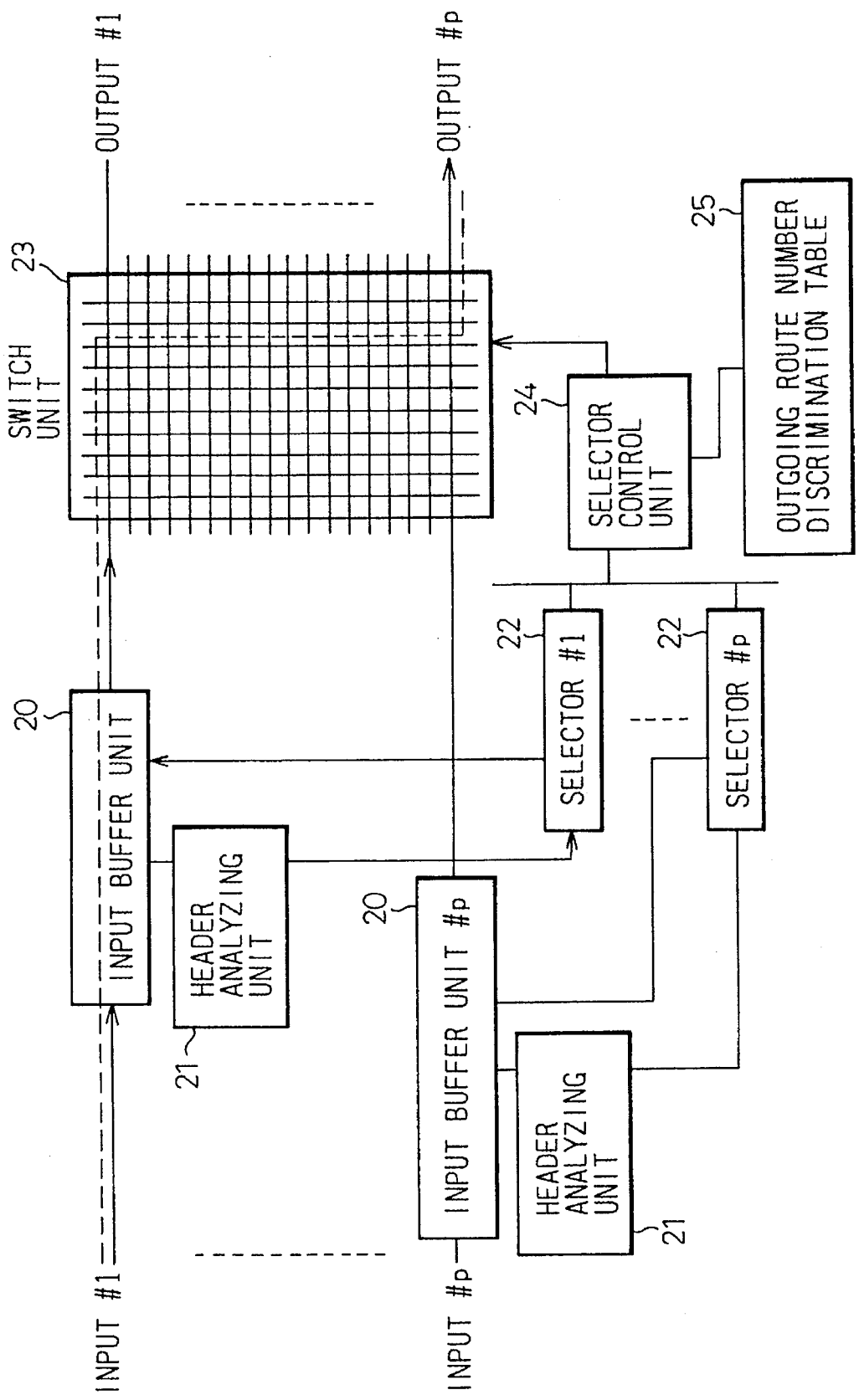
FIG. 9 is a view of the configuration of an ATM switch in an embodiment.

FIG. 9 is a view of the configuration of an ATM switch in an embodiment. In the figure, 20 shows input buffer units provided corresponding to the inputs #1 to #10, 21 shows header analyzing units provided corresponding to the input buffer units 20 and analyzing the headers of the ATM cells stored in the same, 22 shows selectors provided corresponding to the inputs #1 to #p for reading the VPI and VCI obtained by analysis of the headers by the header analyzing units 21 and instructing under instruction by a later mentioned selector control unit 24 the output of ATM cells from the corresponding input buffer units 20, 23 shows a switch unit for forming for a designated time a path between the input and output designated by the selector control unit 24, 24 shows the selector control unit, and 25 shows an outgoing route number discrimination table used by the selector control unit 24 for control of the switch unit 23.

An explanation will now be made of the operation of the ATM switch in FIG. 9 in the order of steps of its operation.

1) A variable length ATM cell is input from the input #1.
2) The ATM cell is held temporarily in an input buffer unit (#1) 20.
3) In the header analyzing unit 21, the VPI, VCI, and RCC (see FIG. 8B) are analyzed and notified to the selector (#1) 22.
4) The selector control unit 24 manages the selectors 22 (#1 to #p) and checks that there is no other selector demanding the same VPI as the selector 22 #1 at that point of time. Next, the selector control unit 24 finds the outgoing route in the outgoing route number discrimination table 25 by the VPI and VCI obtained through the selector.

Here, an explanation will be made of the configuration of the outgoing route number discrimination table 25 using FIG. 10. The selector control unit 24, as shown in FIG. 10, is provided with outgoing route number discrimination tables 25-1 to 25-p corresponding to the selectors #1 to #p. Each of these outgoing route number discrimination tables have set in them numbers of outgoing routes shown by c corresponding to combinations of numbers of VPI's shown by a and VCI's shown by b. The selector control unit 24 uses the tables to find the number of the outgoing route from the VPI and VCI from the header analysis unit 21.

5) When the selector control unit 24 finds the outgoing route number from the outgoing route number discrimination table 25, it writes the RCC obtained from the header analyzing unit 21 in the cell size column (shown by d in FIG. 10) in the table at a position corresponding to the outgoing route number. In this example, "90" is written. Next, according to the outgoing route number discrimination table, the switch unit 23 is controlled to connect the input #1 with corresponding output (in this example, #p).
6) When the path between the input #1 and the output (#p) is secured, the selector control unit 24 instructs the input buffer unit #1 through the selector #1 to transfer the cell.
7) The selector control unit 24 holds the path between the input #1 and output #p of the switch unit 23 to ensure transfer of the cell for exactly the time of the count indicated by the RCC (value of 90) in the cell size column (FIG. 10) (time for 6 byte (octet) cell to pass through the switch).
8) When the time of the count elapses, the selector control unit 24 releases the path between the input #1 and output #p of the switch unit 23, ends the transfer of the cell, and clears the column of the outgoing route number discrimination table.

In this way, the ATM switch uses as a unit of transfer the ATM header length (in this example, 6 octets) and utilizes a counter or timer so as to integrally handle the cell as a whole. When the RCC region is 10 bits, it switches up to a maximum of 6144 octets (6 octets by 1024). It switches in units of 6 octets, but holds the results of analysis (i.e., outgoing route) of the VPI and VCI for exactly the count (RCC) indicated in the header and therefore can ensure the same switching for all 6-octet units in a cell.

Next, an explanation will be made of the configuration of the physical layer according to the system for transferring variable length cells under an ATM in the present invention. The physical layer is composed of a physical medium sublayer and a transmission convergence sublayer.

Physical medium sublayer

The physical medium sublayer provides a bit transfer capability in accordance with the physical medium, such as an optical fiber or coaxial cable, and sends and receives a continuous flow of bits accompanied with timing information with the transmission convergence sublayer.

Transmission convergence sublayer

The transmission convergence sublayer composes transmission frames serving as the physical means for carrying the user information on the physical medium, ensures the correctness of the payload, and supplies the cell flows in the payload to the ATM layer.

In the present invention, the ATM cell is carried by the synchronous digital hierarchy (SDH) transmission system. That is, The ATM cell is mapped in the SDH frames. For the cell synchronization system, use is made of path overhead (POH) synchronization. At the initial stage of introduction of ATM systems, however, it is desirable to enable carrying by other existing transmission systems as well. Accordingly, in the present invention, in the transmission convergence sublayer, use is made of an autonomous cell synchronization mechanism such as explained next, wherein the cell boundary is discriminated by the cell itself traveling through the same channel.

(1) Cell synchronization mechanism

Cell synchronization is processing for discriminating cell boundaries from the continuous flow of cells. In the present invention, synchronization is established by an operation for establishing synchronization for 6-octet units of transfer and an operation for discriminating the cell boundaries from the boundaries of these 6-octet units of transfer.

Figure 11A:
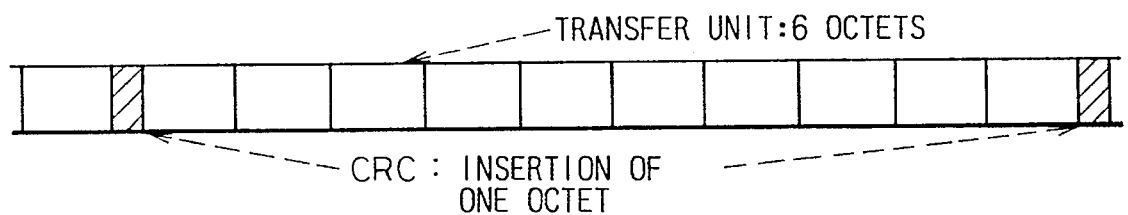
FIGS. 11A and 11B are views explaining the method of establishing synchronization at physical layers.
Figure 11B:
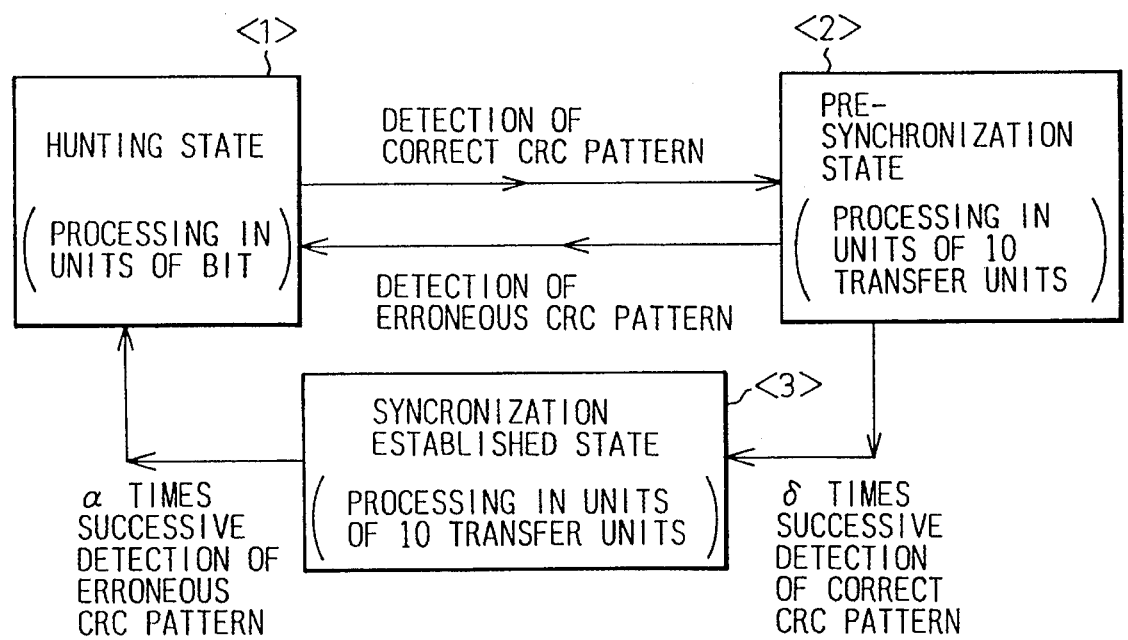

FIGS. 11A and 11B are views explaining the method of establishing synchronization at physical layers.

When variable length ATM cells having 6-octet minimum units of transfer, as adopted in this embodiment, are transferred at the physical layer, it is necessary to discriminate the boundaries of the 6-octet (byte) units of transfer. Therefore, in the present invention, as shown in FIG. 11A, a 1-octet cyclic redundancy check (CRC, data encoding the remainder after division of the subject data by a set generation polynomial) is prepared and added to the immediately preceding unit of transfer (octet) every other 10 6-octet units of transfer. In this case, it is also possible to prepare and add CRC codes to two units of transfer, that is, the immediately preceding unit of transfer (6 octets) and the unit of transfer before that.

The following method is used for establishing synchronization by detecting 6-octet units of transfer from the signals of the physical layer with the CRC codes inserted in them in this way.

FIG. 11B is a state transition chart for discrimination of the boundaries of units of transfer. When discriminating boundaries (establishing synchronization) from the signals shown in FIG. 11A, the first state is the hunting state shown by <1>. This state is a state of asynchronization where the boundaries of the units of transfer are hunted for by bit processing. At this time, the units of transfer of this embodiment, that is, the 6 octets, are checked for each bit to see if they match the CRC code pattern (if syndrome is 0). If the pattern is not found, the start is shifted by 1 bit and similar processing is performed. The hunt is performed by successively shifting the start by 1 bit.

Once such a state is detected, it is assumed that a unit of transfer has been detected and the pre-synchronization state shown by <2> is entered. In the pre-synchronization state, processing for establishing synchronization of the unit of transfer is repeated until a CRC code pattern is confirmed successively δ times in 10 units of transfer. These δ matches constituting a condition for entering the synchronization established state are called the "rear protection stages".

When the CRC code pattern is detected successively δ times, the synchronization established stage shown by <3> is entered. In this state, when the CRC code pattern is erroneous successively α number of times in 10 units of transfer, it is deemed that the unit of transfer is not synchronized. The α non-matches constituting a condition for returning to the hunting state are called the "front protection stages".

The synchronization established state of <3> and the pre-synchronization state of <2> together constitute a synchronization state in the broad sense. Note that even when ATM cells are not being transferred, 6-octet units of transfer of all "1" data, or "abort", are transferred at the physical layer, so it is possible to establish synchronization as mentioned above.

When the unit of transfer is synchronized, the boundary of the variable length ATM cell is discriminated. Therefore, the CRC code (1 octet) detected by the establishment of synchronization is deleted and an operation is performed for discriminating the cell boundary.

(2) Discrimination of cell boundary

When the boundary of a unit of transfer is discriminated by the above-mentioned (1) and the CRC code is deleted, the cell boundary is discriminated.

Figure 12A:
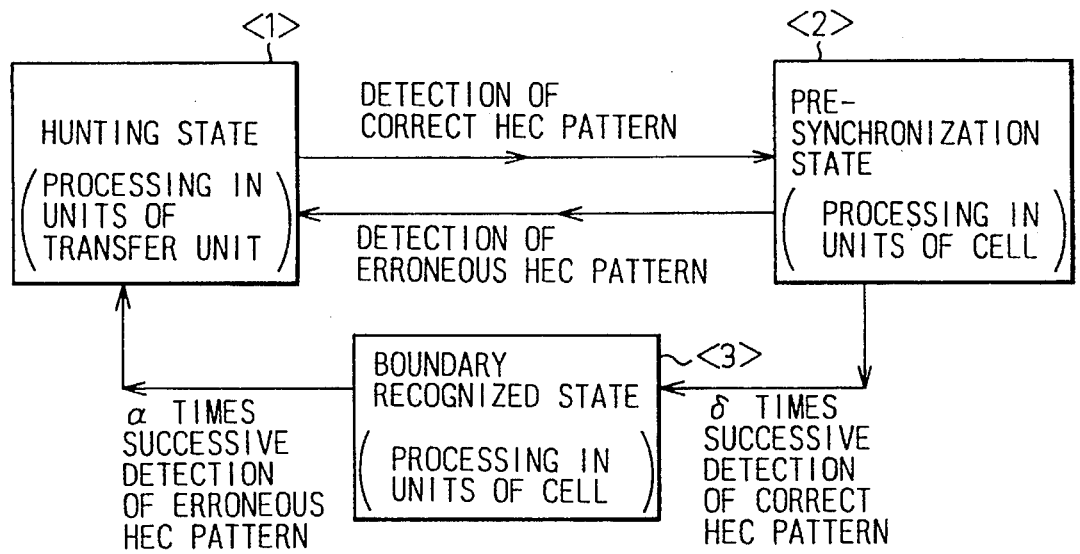
FIGS. 12A and 12B are views explaining the method of discrimination of cell boundaries and extraction of cells.
Figure 12B:
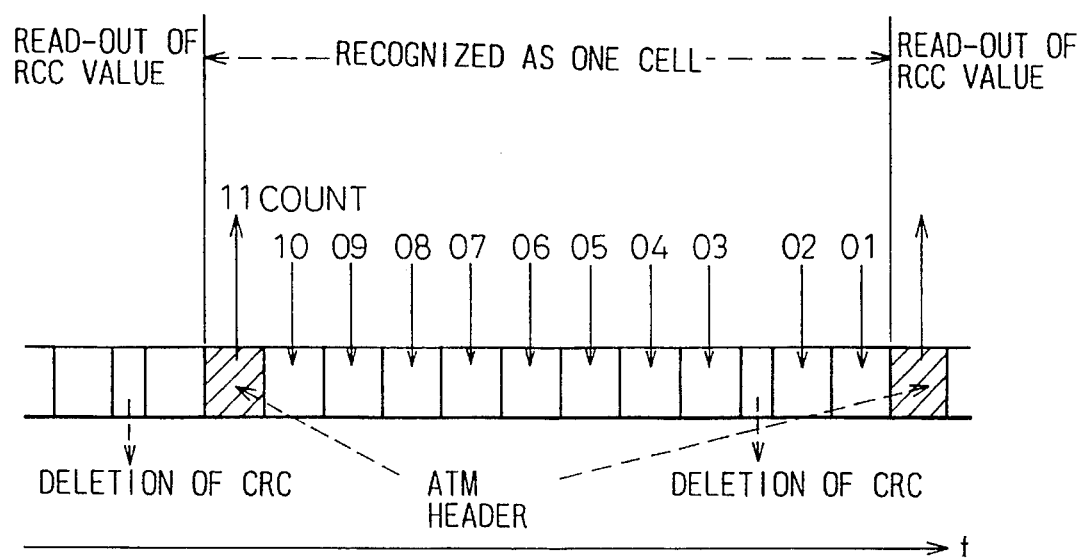

FIGS. 12A and 12B are views explaining the method of discrimination of a cell boundary and extraction of a cell. In this embodiment, the boundary of a variable length ATM cell is discriminated by detecting a header error control (HEC, see FIG. 8B) pattern (1 octet) in the header (6 octets) of the ATM cell based on the discriminated unit of transfer (6 octets).

As shown by the state transition chart for discrimination of cell boundaries of FIG. 12A, the cell boundary is not known at the start, so hunting is performed as shown in <1>. In this case, when assuming each unit of transfer (6 octets) to be a header, each unit of transfer is examined to see if the sixth octet in it fits as the HEC of the first to fifth octets before it. Once such a match is detected, it is assumed that one cell has been detected and the pre-boundary recognition state shown by <2> is entered.

When the pre-boundary recognition state is entered, the value (m) of the RCC code included in the detected ATM header is used for processing for discrimination of the cell boundary. That is, the RCC code is information showing the number of units of transfer (6 octets), so the units of transfer following the header detected as the boundary are successively counted. When m number of units of transfer are counted, it is judged that one cell has been received and the cell is transferred to the ATM layer. If the cell boundary is correctly detected, it is possible to detect the HEC (cell boundary) from the unit of transfer (6 octets) following the end of the cell unit.

In this way, in the pre-boundary recognition state, processing is repeated until the cell boundary is discriminated and the correct HEC is detected successively δ times. When detected 6 times, the boundary recognition state shown by <3> in FIG. 12A is entered. The 6 matches constituting a condition for entering the boundary recognition state are called the "rear protection stages".

In the boundary recognition state of <3>, processing is performed to detect the ATM cell and transfer it to the ATM layer as shown in FIG. 12B by detection of the HEC pattern in the same way as in the pre-boundary recognition state. If the HEC code is erroneous even once in α number of cells, however, it is judged that the cell boundary has been lost and the hunting state of <1> is returned to. The α non-matches constituting a condition for returning to the hunting state are called the "front protection stages".

The pre-boundary recognition state shown by <2> and the boundary recognition state shown by <3> constitute the boundary definition state in the broad sense of the term.

In this way, the transfer of the ATM cells from the physical layer to the ATM layer is performed in cell units by processing for discrimination of cell boundaries, so separation of cells at the ATM layer becomes possible.

Figure 13:
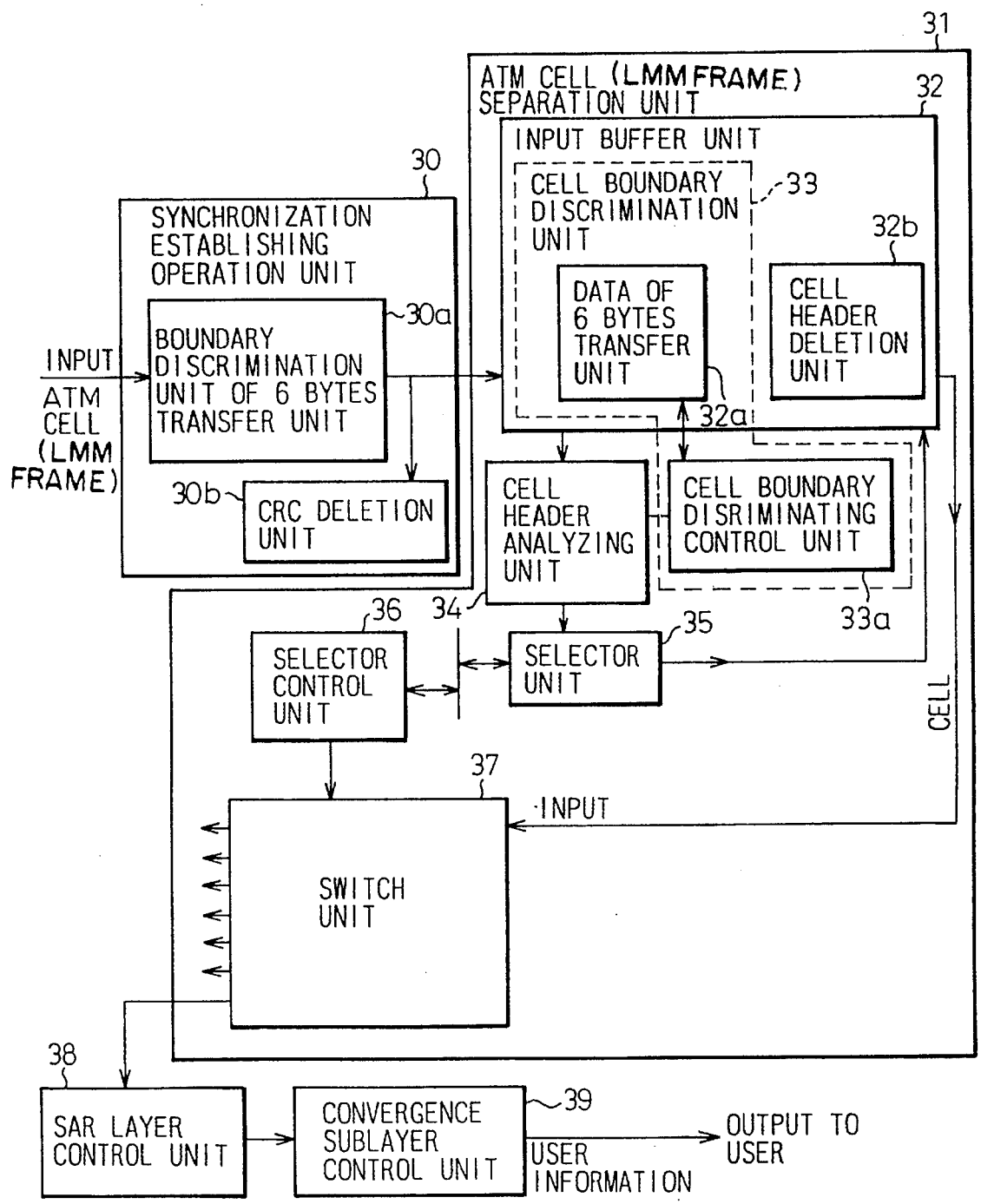
FIG. 13 is a view of the configuration of an embodiment of an ATM exchange handing variable length ATM cells.

FIG. 13 is a view of the configuration of an embodiment of an ATM exchange handing variable length ATM cells.

In FIG. 13, 30 is a synchronization establishing operation unit, 31 is an ATM cell separation unit, 32 is an input buffer unit, 33 is a cell boundary discriminating control unit, 34 is a cell header analyzing unit, 35 is a selector unit, 36 is a selector control unit, 37 is a switch unit, 38 is an SAR layer control unit, and 39 is a convergence sublayer control unit. Variable length ATM cells of a minimum unit of transfer of 6 octets (bytes) are multiplexed on the input/output lines of the ATM exchange.

Explaining the operation of the exchange, an ATM cell entering from the input to the synchronization establishing operation unit 30 is processed by the 6-byte transfer unit boundary discrimination unit 30a to detect the CRC (1 octet) code and discriminate the 6 byte unit of transfer by the method explained with reference to FIGS. 11A and 11B. When the synchronization state is established, the CRC code is deleted at the CRC deletion unit and the result is output to the ATM separation unit 31.

At the ATM cell separation unit 31, the 6-byte unit of transfer data 32a input to the input buffer unit 32 is processed by the cell boundary discriminating control unit 33a forming part of the cell boundary discrimination unit 33 to discriminate the boundary of the ATM cell. At the cell boundary discriminating control unit 33a, the HEC of the cell header is detected and the boundary recognized by the method explained with reference to FIGS. 12A and 12B. When an HEC is detected, the RCC in the 6-byte header including the HEC is detected so as to extract the data composing the ATM cell. When the cell is output from the input buffer unit 32 to the switch unit 37, the cell header is deleted by the cell header deletion unit 32b.

The ATM switch shown in FIG. 9 is composed of the input buffer unit 32, cell header analyzing unit 34, selector unit 35, selector control unit 36, and switch unit 37 of FIG. 13. The cell header analyzing unit 34 analyzes the 6-octet cell header stored in the input buffer unit 32 using the cell boundary discrimination output from the cell boundary discrimination unit 33 and supplies the VPI, VCI, RCC, etc. from the selector unit 35 to the selector control unit 36. After this, the ATM switch operates in the same way as explained with reference to FIG. 9. A detailed explanation is not given here, but the address is identified by the VPI and VCI and the ATM cell (payload) is output through the switch unit 37 to the outgoing line connecting to the corresponding user.

The ATM cell output from the switch unit 37 is input to the SAR layer control unit 38 where, opposite to the processing explained with reference to the configuration of the ATM cell of FIGS. 8A and 8B and the SAR-PDU at the SAR sublayer shown in FIG. 7, processing is performed to take out the SAR-PDU header and SAR-PDU trailer from the ATM payload (SAR-PDU plus SAR header and trailer and ineffective data to bring length to multiple of 6 octets) and the length of information shown by the LI included in the SAR header is extracted from the SAR-PDU+ineffective data and output to the convergence sublayer control unit 39.

At the convergence sublayer control unit 39, processing is performed to take out the CS-PDU header and CS-PDU trailer from the data from the SAR layer control unit 38 and the portion of the CS-PDU payload is output as the user information.

Figure 14:
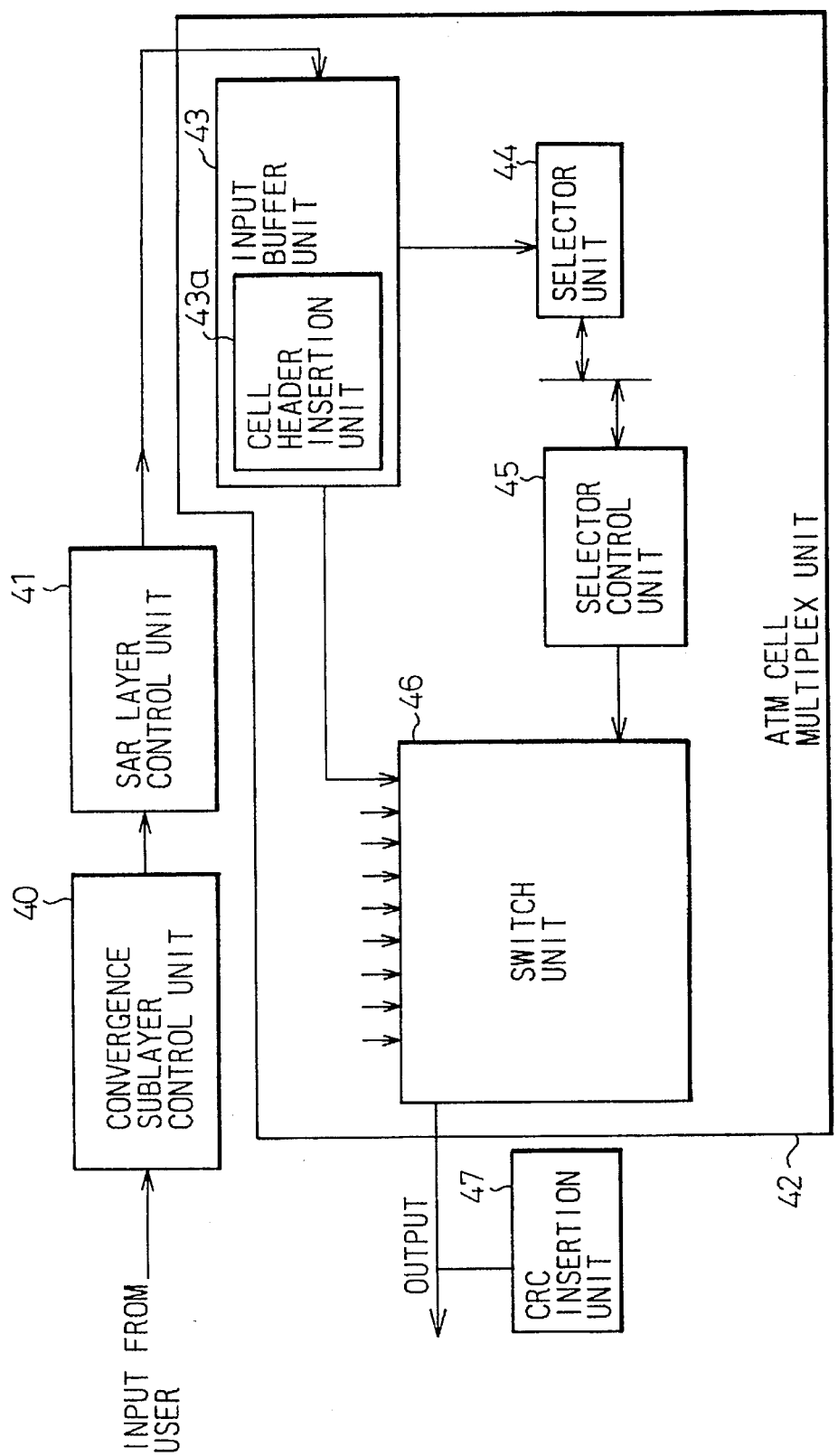
FIG. 14 is a view of the configuration of a cell output apparatus at a UNI according to the present invention.

FIG. 14 is a view of the configuration of a cell output apparatus at a user network interface (UNI) according to the present invention. In FIG. 14, 40 is a convergence sublayer control unit, 41 is an SAR layer control unit, 42 is an ATM cell multiplex unit, 43 is an input buffer unit, 44 is a selector unit, 45 is a selector control unit, 46 is a switch unit, and 47 is a CRC insertion unit.

The UNI cell output apparatus outputs user information input from a user to a network transferring the same by variable length ATM cells. The convergence sublayer control unit 40 prepares CS-PDU's of the format shown in FIG. 6 and inputs the CS-PDU's to the next SAR layer control unit 41 where SAR-PDU's of the format shown in FIG. 7 are prepared.

At this time, control is performed for adding ineffective data to bring the total length of data to a multiple of 6 octets. The SAR-PDU data is next input to the input buffer unit 43 where an ATM cell having the format shown in FIG. 8A is prepared. At this time, a 6-octet header (see FIG. 8B) is prepared at the cell header insertion unit 43a.

In this case, values of the VPI and VCI are selected in accordance with the address to be communicated with by reference to a table (not shown) holding values preset from a higher apparatus for call control, not shown. The ATM cell with the cell header inserted is switched to the output line corresponding to the VPI and VCI in the switch unit 46 by the same type of processing as in FIG. 9 under the control of the selector unit 44 and selector control unit 45. At the output side, a CRC (1 octet) code is inserted by the CRC insertion unit 47 as shown in FIG. 11A and the result is output to the transmission path.

The configuration of the cell input apparatus at a UNI according to the present invention is similar to that of the ATM exchange shown in FIG. 13, so an illustration of the same will be omitted. In the case of the cell input apparatus, the ATM cell of the physical layer shown in FIG. 11A is input from the input side in FIG. 13. The data output from the switch unit 46 passes through the SAR layer control unit and convergence sublayer control unit and is output to a user reproduced to the original user information.

Connection with ATM network using fixed length cells

Next, an explanation will be made of a network node interface (NNI) for connecting the network of the present invention using variable length cells to a public or private ATM network using fixed length cells.

In this case too, like with a UNI, a virtual channel connection is set or released. Variable length cells and fixed length cells are converted to each other at the NNI both by the function of the ATM adaptation layer (AAL) and by the function of the ATM layer. An explanation will be made below of each case with reference to FIGS. 15A and 15B explaining an NNI with a fixed length cell network.

NNI using AAL

Figure 15A:
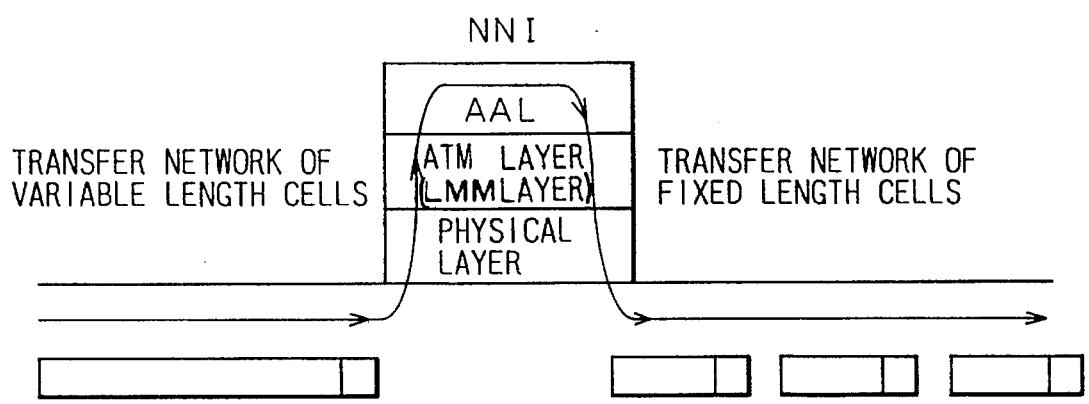
FIGS. 15A and 15B are views explaining a network-node interface (NNI) connected to a network handling fixed length cells.

FIG. 15A shows an NNI using an ATM adaptation layer (AAL). The left side of the figure shows a transfer network using variable length cells according to the present invention. When a variable length cell is input to the NNI, it is converted to data of the physical layer and data of the ATM layer (protocol data unit) and returned to the AAL convergence sublayer (CS), at which time, as shown in FIG. 6, it becomes the same configuration of data as the AAL (CS layer) as the case of a fixed length cell. Accordingly, after the variable length cell data is returned to the AAL convergence sublayer (CS), it is converted to ATM cells by the processing of the fixed length ATM layer (existing 53 octet ATM cell)

which are then sent to the fixed length cell physical layer. By this, 53 octet fixed length cells are successively transferred to the fixed length cell transfer network. In this system, the variable length cell network of the present invention is able to transfer data in any cell lengths regardless of the NNI. Since it is necessary to break down the ATM cell at the convergence sublayer (CS) once, however, there is the problem that time is taken for the protocol processing.

NNI using ATM layer

Figure 15B:
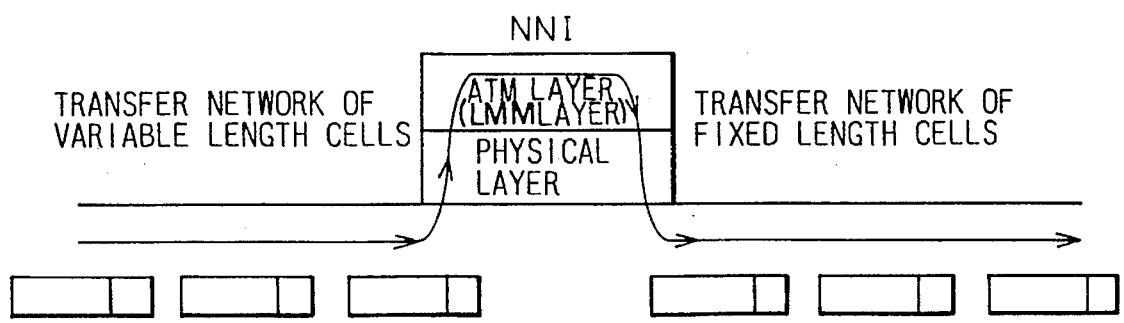

In this system, as shown in FIG. 15B, the NNI only performs processing on the transfer data until the ATM layer. That is, when the NNI receives a variable length cell, it replaces the header of the received cell with a header of a fixed length cell and transfers the result to the fixed length cell network. Therefore, connection apparatus connected with the fixed length cell network has to make the length of the payload of the variable length cell to be transferred the same 48 octets as a fixed length cell. The header, however, is 6 octets.

Figure 16:
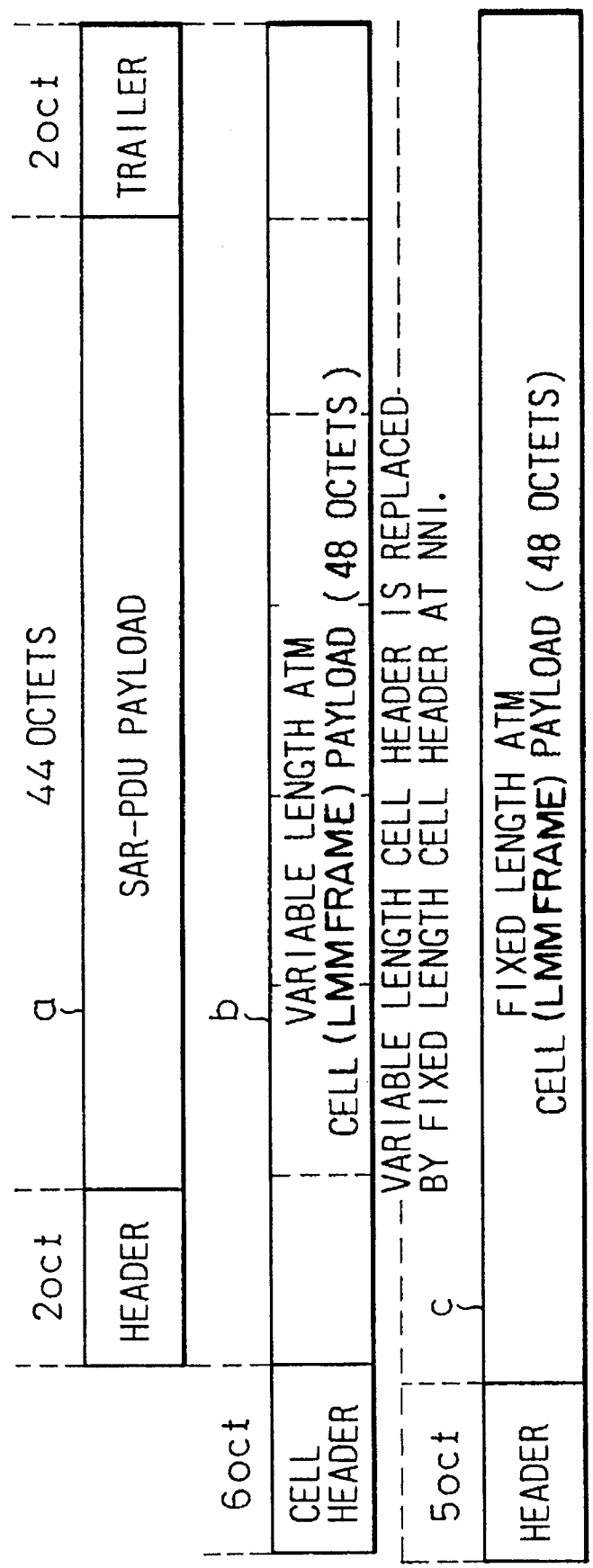
FIG. 16 is a view explaining the conversion from variable length cells to fixed length cells at the NNI.

FIG. 16 is a view explaining the conversion from variable length cells to fixed length cells at the NNI. The connection apparatus for connecting the variable cell network to the fixed cell network, as shown in B of FIG. 16, changes the payload of the variable length cell to 48 octets and uses the header of the original variable length cell (6 octets) as is as the cell header to obtain a total length of 54 octets (bytes). The data of B is obtained in the connection apparatus by converting the variable length cell to a format of a total of 48 bits, that is, the 44 octet SAR-PDU payload and a 2-octet header and trailer at the AAL SAR sublayer as shown in A of FIG. 16.

The variable length cell of the format shown in B of FIG. 16 replaces the variable length cell header (6 octets) with a fixed length cell header (5 octets) so as to obtain the fixed length cell shown in C of FIG. 13 (total 53 octets).

In this way, if the ATM cell length is 48 octets, the units of data handled at the layers starting from the ATM adaptation layer are exactly the same in both the variable length ATM system and fixed length ATM system.

Accordingly, by just replacing the ATM cell header at the NNI, it becomes possible to connect a variable length cell network and fixed length cell network.

In the NNI system, the connection apparatus connected with the fixed length cell network does not necessarily transfer 54 octet cells, so the effect of the invention cannot be sufficiently achieved. It is, however, a system effective in enabling connection with a fixed length cell network without complicated protocol processing by the adaptation layer.

When setting up a connection through an NNI by using the ATM layer, it is sufficient to select at the UNI a mode for transferring variable length cells in payload lengths of 48 octets.

In the asynchronous transfer mode (ATM), by not making the unit of transfer the fixed length ATM cell, but making it a bit train of a minimum unit of transfer of n-octets and handling the bit train of this unit of transfer together with a single cell header, it is possible to prepare a variable length ATM cell of a length corresponding to the properties of the information being communicated and sent it through the network. By this, in so far as the quality of service (QOS) agreed on by the connection resources is ensured for communication of burst-like amounts of information, it is possible to transfer data by the optimal length of ATM cells at all times. Accordingly, it is possible to increase the efficiency of utilization of the connection resources at the time of statistical multiplexing.

Compared with the convention system of transfer (frame relay and fixed length ATM), the system of transfer of variable length cells of the present invention has the following features:

<1> Case of burst-like generation of data

In this case, the overhead becomes large in fixed length cell ATM and the frame relay system sometimes becomes more efficient. That is, the longer the length of a frame is, the smaller the overhead of the frame relay system and the more efficient the use of the transmission band are. In the case of the frame relay system, the control data for each frame is about 5 to 6 bytes. When calculated in terms of the frame length (512 bytes) used for connection between general routes, over 99 percent of the transmission band can be used for the transmission of the user data. In this regard, with the variable length cells of the present invention, since long data can be stored in the payload of a single cell, the same feature is obtained as in the frame relay system and therefore the invention is more advantageous compared with the conventional fixed length cell ATM system in the same manner.

<2> Case of large number of relaying stages (number of hops)

Figure 17A:
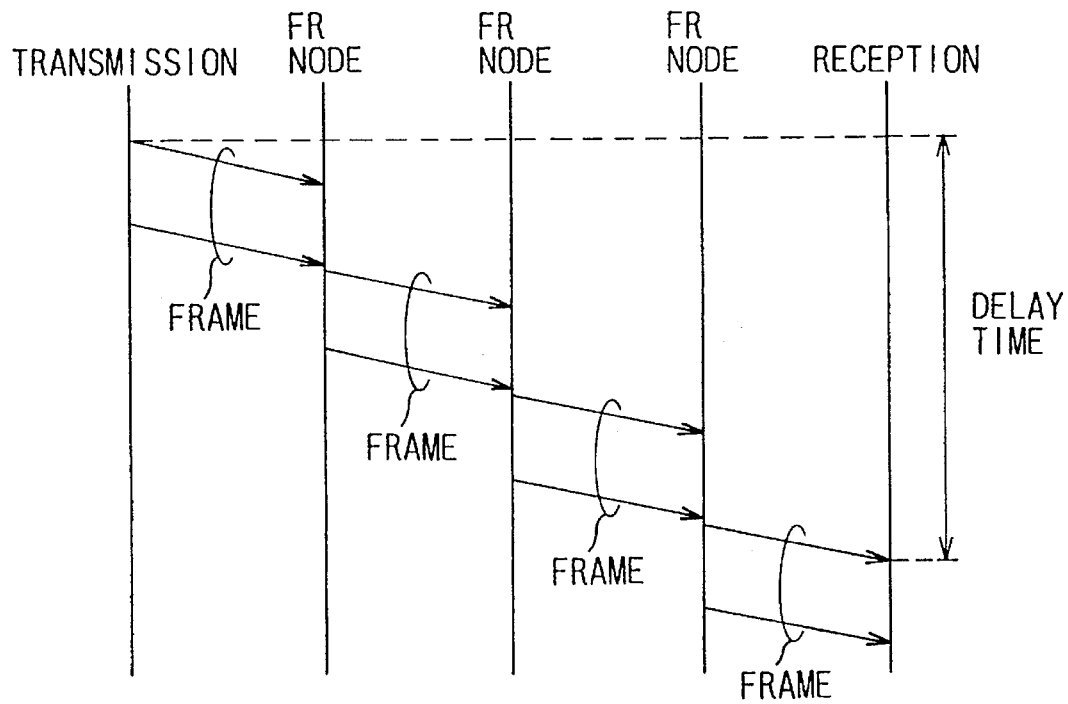
FIGS. 17A and 17B are views of delay times in two transfer systems.
Figure 17B:
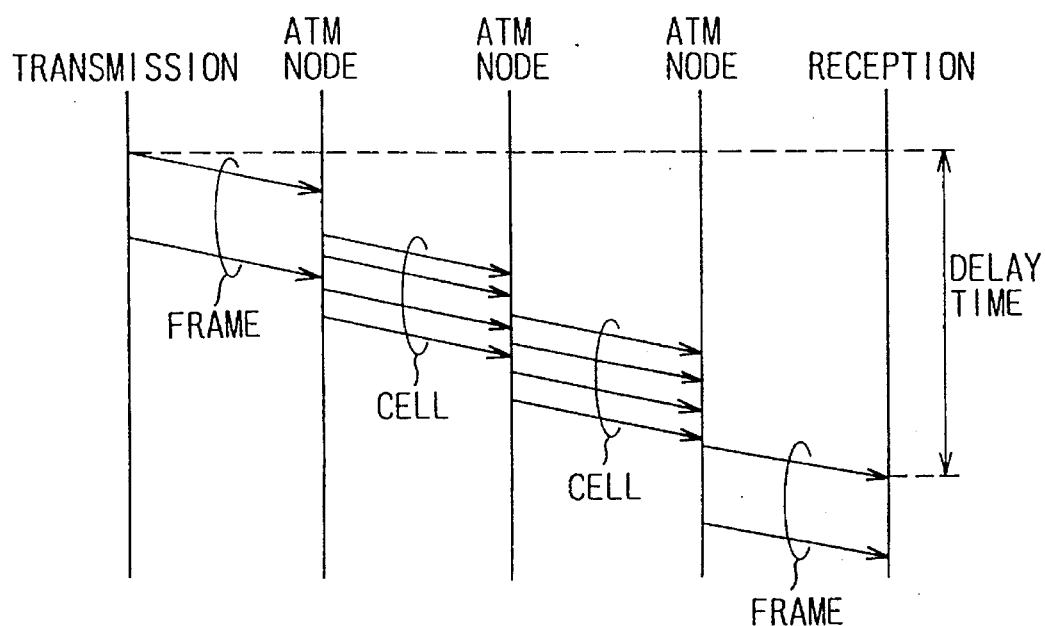

Explaining this case with reference to FIGS. 17A and 17B showing the delay times in the two transfer systems, according to the frame relay system shown in FIG. 17A, the frame as a whole is received at the frame relay (FR) node. When no error is found in the received frame, transfer to the next exchange is started. Since it is necessary to store the frame as a whole momentarily in the memory to perform the error check, it is not possible to start the transfer processing while the frame is being received. Accordingly, the delay time becomes long. As opposed to this, in the system of transferring fixed length ATM cells, the cells are short, so the transfer delay is small. In the same way, in the system of transfer of variable length ATM cells of the present invention, as shown in FIG. 17B, the error check is performed in units of 60 bytes regardless of the frame length, so even if a cell becomes large like in the frame relay system, it is possible to transfer data with about the same transfer delay as in a conventional ATM system.

<3> Case of transfer of voice data

In the conventional fixed length ATM system, when the existing line speed was "slow" (e.g., 1.5 Mbps), it was difficult to realize real time voice communication. In the present invention, however, when performing voice communication, it is possible to realize voice communication with even a low speed line (e.g., 1.5 Mbps) not realizable by the conventional ATM system by making the cell length 24 octets, for example. That is, in the conventional ATM system, it was necessary to transmit 53 octet cells every 125 μsec. A 3.4 Mbps high speed line was required for this. In the present invention, however, this transmission can be handled even by a 1.5 Mbps low speed line.

The above-mentioned explanation was made on the basis of the ATM transmission system. However it should be understood that the concept of the present invention can be adapted not only to such an ATM transmission system but also other types of transmission systems.

A known packet transmission technique has been proposed in place of a conventional line switching technique. In recent years, however, the packet transmission technique too is being replaced by a known frame relay transmission technique. The frame relay transmission technique will certainly be replaced, sooner or later, by the ATM transmission technique to which the present invention refers.

Under the circumstances, in the future, it is probable, in view of the above-mentioned history in technical development, that the ATM transmission technique will also be replaced by another transmission technique.

As apparent from the disclosure hereinbefore, the technical concept per se of the present invention is applicable not only to the current ATM transmission technique but also other transmission techniques which may become available in place of the current ATM transmission technique.

Accordingly, in the following, the term "ATM" or terms relating to ATM are not employed therein as they are, but generic terms identical thereto are used.

For example, the term "ATM" is expressed by —labeled multiplexing mode (LMM)—, the term "payload" is expressed by —information field—, the term "SAR layer" is expressed by —first sublayer—, which is operative to perform a cell segmentation and reassembly, the term "HEC" is expressed by —header error control—, the term "AAL layer" is expressed by —LMM adaptation layer—, the term "VPI and VCI" is expressed by -routing information—, and the term "CS" is expressed by —second sublayer—, which is operative to perform a checking for errors in the data and verifying the correctness—.

I claim:

1. A system for transferring variable length frames in a labeled multiplexing mode (LMM) such as ATM, comprising:

means for composing a LMM layer having variable length LMM frames with an n-octet header and a LMM frame information field of a length of a whole multiple m (m>1) of a minimum unit of transfer, using as said minimum unit of transfer a length of n (8 >n>6) octets (bytes) of the LMM frame, and means for storing in the information field of said LMM frame the information generated from a higher layer, said information field being adjusted in length to a length of a whole multiple of the minimum unit of transfer, and for setting data in the header indicating the length of the variable length frame.

2. A system for transfer as set forth in claim 1, wherein the minimum unit of transfer is 6 octets (n=6) and the data from the higher layer is stored in the information field adjusted to a length of a whole multiple m of 6 octets and the header includes a region of at least 1 octet for storing routing information, header error control bits, and the multiple (m) indicating the length of the data to be stored in the information field.

3. A system for transfer as set forth in claim 1, wherein a first sublayer-protocol data unit (first sublayer-PDU), having a header and trailer, for performing segmentation and reassembly, said first sublayer-PDU being adjustable at an LMM adaptation layer higher than the LMM layer, by adding ineffective data such that the first sublayer-PDU becomes a whole multiple of the n-octets and a region, provided in the trailer of the first sublayer-PDU in said LMM adaptation layer to indicate the length of effective data in the information field, is set with the number of octets remaining after division by 44 of the number of octets of the effective data in the information field.

4. A system for transfer as set forth in claim 2, wherein a first sublayer-protocol data unit (first sublayer-PDU), having a header and trailer, for performing segmentation and reassembly, said first sublayer-PDU being adjustable at an LMM adaptation layer higher than the LMM layer, by adding ineffective data such that the first sublayer-PDU becomes a whole multiple of the n-octets and a region provided in the trailer of the first sublayer-PDU in the layer to indicate the length of the effective data in the information field is set with the number of octets remaining after division by 44 of the number of octets of the effective data in the information field.

5. A system for transferring as set forth in claim 1, wherein a physical layer lower than the LMM layer successively and continuously transfers the variable length cells to a transmission channel using as units of transfer the n-octets and a transmission side of data inserts into the data a pattern of a constant length at every set of data comprised of n-octet units of transfer and a reception side for transmitted data discriminates a boundary of a minimum unit of transfer by detecting the constant length pattern.

6. A system for transfer as set forth in claim 2, wherein a physical layer lower than the LMM layer successively and continuously transfers the variable length cells to a transmission channel using as units of transfer the n-octets and a side for transmission of data inserts into the data a pattern of a constant length at every set of data comprised of n-octet units of transfer and a reception side for transmitted data discriminates a boundary of a minimum unit of transfer by detecting the constant length pattern.

7. A system for transfer as set forth in claim 3, wherein a physical layer lower than the LMM layer successively and continuously transfers the variable length cells to a transmission channel using as units of transfer the n-octets and a side for transmission of data inserts into the data a pattern of a constant length at every set of data comprised of n-octet units of transfer and a reception side for transmitted data discriminates a boundary of a minimum unit of transfer by detecting the constant length pattern.

8. A system for transfer as set forth in claim 4, wherein a physical layer lower than the LMM layer successively and continuously transfers the variable length cells to a transmission channel using as units of transfer the n-octets and a side for transmission of data inserts into the data a pattern of a constant length at every set of data comprised of n-octet units of transfer and a reception side for transmitted data discriminates a boundary of a minimum unit of transfer by detecting the constant length pattern.

9. A system for transfer as set forth in claim 5, wherein the constant length pattern is composed of a CRC code of a certain length obtained from the one or more n-octet units of transfer appearing before the pattern and the reception side performs a detection operation of the pattern in units of bits in which it deems a pre-synchronization state is entered when the constant length pattern is detected, a synchronization established state is entered when that pattern is detected successively a preset number of times, and a hunting state when that pattern is not detected successively a preset number of times.

10. A system for transfer as set forth in claim 6, wherein the constant length pattern is composed of a CRC code of a certain length obtained from the one or more n-octet units of transfer appearing before the pattern and the reception side performs a detection operation of the pattern in units of bits in which it deems a pre-synchronization state is entered when the constant length pattern is detected, a synchronization established state is entered when that pattern is detected successively a preset number of times, and a hunting state when that pattern is not detected successively a preset number of times.

11. A system for transfer as set forth in claim 7, wherein the constant length pattern is composed of a CRC code of a certain length obtained from the one or more n-octet units of transfer appearing before the pattern and the reception side performs a detection operation of the pattern in units of bits in which it deems a pre-synchronization state is entered when the constant length pattern is detected, a synchronization established state is entered when that pattern is detected successively a preset number of times, and a hunting state when that pattern is not detected successively a preset number of times.

12. A system for transfer as set forth in claim 8, wherein the constant length pattern is composed of a CRC code of a certain length obtained from the one or more n-octet units of transfer appearing before the pattern and the reception side performs a detection operation of the pattern in units of bits in which it deems a pre-synchronization state is entered when the constant length pattern is detected, a synchronization established state is entered when that pattern is detected successively a preset number of times, and a hunting state when that pattern is not detected successively a preset number of times.

13. A system for transfer as set forth in claim 5, wherein when the reception side detects an n-octet unit of transfer in a pre-synchronization state or synchronization established state, it deletes the constant length pattern and hunts for a header error control pattern in each detected unit of transfer and when the reception side detects the header error control pattern, it identifies the unit of transfer including the header error control pattern as a header indicating the boundary of the variable length frame, deems the units of transfer of the length indicated by the data to be a single variable length frame, and transfers the same to the LMM layer.

14. A system for transfer as set forth in claim 6, wherein when the reception side detects an n-octet unit of transfer in a pre-synchronization state or synchronization established state, it deletes the constant length pattern and hunts for a header error control pattern in each detected unit of transfer and when the reception side detects the HEC pattern, it identifies the unit of transfer including the header error control pattern as a header indicating the boundary of the variable length frame, deems the units of transfer of the length indicated by the data to be a single variable length frame, and transfers the same to the LMM layer.

15. A system for transfer as set forth in claim 7, wherein when the reception side detects an n-octet unit of transfer in a pre-synchronization state or synchronization established state, it deletes the constant length pattern and hunts for a header error control pattern in each detected unit of transfer and when the reception side detects the header error control pattern, it identifies the unit of transfer including the header error control pattern as a header indicating the boundary of the variable length frame, deems the units of transfer of the length indicated by the data to be a single variable length frame, and transfers the same to the LMM layer.

16. A system for transfer as set forth in claim 8, wherein when the reception side detects an n-octet unit of transfer in a pre-synchronization state or synchronization established state, it deletes the constant length pattern and hunts for a header error control pattern in each detected unit of transfer and when the reception side detects the header error control pattern, it identifies the unit of transfer including the header error control pattern as a header indicating the boundary of the variable length frame, deems the units of transfer of the length indicated by the data to be a single variable length frame, and transfers the same to the LMM layer.

17. A system for transfer as set forth in claim 9, wherein when the reception side detects an n-octet unit of transfer in the pre-synchronization state or synchronization established state, it deletes the constant length pattern and hunts for a header error control pattern in each detected unit of transfer and when the reception side detects the HEC pattern, it identifies the unit of transfer including the header error control pattern as a header indicating the boundary of the variable length cell, deems the units of transfer of the length indicated by the data to be a single variable length cell, and transfers the same to the LMM layer.

18. A system for transfer as set forth in claim 10, wherein when the reception side detects an n-octet unit of transfer in the pre-synchronization state or synchronization established state, it deletes the constant length pattern and hunts for a header error control pattern in each detected unit of transfer and when the reception side detects the header error control pattern, it identifies the unit of transfer including the header error control pattern as a header indicating the boundary of the variable length frame, deems the units of transfer of the length indicated by the data to be a single variable length frame, and transfers the same to the LMM layer.

19. A system for transfer as set forth in claim 11, wherein when the reception side detects an n-octet unit of transfer in the pre-synchronization state or synchronization established state, it deletes the constant length pattern and hunts for a header error control pattern in each detected unit of transfer and when the reception side detects the header error control pattern, it identifies the unit of transfer including the header error control pattern as a header indicating the boundary of the variable length frame, deems the units of transfer of the length indicated by the data to be a single variable length frame, and transfers the same to the LMM layer.

20. A system for transfer as set forth in claim 12, wherein when the reception side detects an n-octet unit of transfer in the pre-synchronization state or synchronization established state, it deletes the constant length pattern and hunts for a header error control pattern in each detected unit of transfer and when the reception side detects the header error control pattern, it identifies the unit of transfer including the header error control pattern as a header indicating the boundary of the variable length frame, deems the units of transfer of the length indicated by the data to be a single variable length frame, and transfers the same to the LMM layer.

21. A system for transfer as set forth in claim 13, wherein the reception side performs a detection operation of the header error control pattern in units of bits in which it deems a pre-boundary recognition state is entered when the header error control pattern is detected, a boundary recognition state is entered when that header error control pattern is detected successively a preset number of times, and a hunting state when that header error control pattern is not detected successively a preset number of times.

22. A system for transfer as set forth in claim 14, wherein the reception side performs a detection operation of the header error control pattern in units of bits in which it deems a pre-boundary recognition state is entered when the header error control pattern is detected, a boundary recognition state is entered when that header error control pattern is detected successively a preset number of times, and a hunting state when that header error control pattern is not detected successively a preset number of times.

23. A system for transfer as set forth in claim 15, wherein the reception side performs a detection operation of the header error control pattern in units of bits in which it deems a pre-boundary recognition state is entered when the header error control pattern is detected, a boundary recognition state is entered when that header error control pattern is detected successively a preset number of times, and a hunting state when that header error control pattern is not detected successively a preset number of times.

24. A system for transfer as set forth in claim 16, wherein the reception side performs a detection operation of the header error control pattern in units of bits in which it deems a pre-boundary recognition state is entered when the header error control pattern is detected, a boundary recognition state is entered when that header error control pattern is detected successively a preset number of times, and a hunting state when that header error control pattern is not detected successively a preset number of times.

25. A system for transfer as set forth in claim 17, wherein the reception side performs a detection operation of the header error control pattern in units of bits in which it deems a pre-boundary recognition state is entered when the header error control pattern is detected, a boundary recognition state is entered when that header error control pattern is detected successively a preset number of times, and a hunting state when that header error control pattern is not detected successively a preset number of times.

26. A system for transfer as set forth in claim 18, wherein the reception side performs a detection operation of the header error control pattern in units of bits in which it deems a pre-boundary recognition state is entered when the header error control pattern is detected, a boundary recognition state is entered when that header error control pattern is detected successively a preset number of times, and a hunting state when that header error control pattern is not detected successively a preset number of times.

27. A system for transfer as set forth in claim 19, wherein the reception side performs a detection operation of the header error control pattern in units of bits in which it deems a pre-boundary recognition state is entered when the header error control pattern is detected, a boundary recognition state is entered when that header error control pattern is detected successively a preset number of times, and a hunting state when that header error control pattern is not detected successively a preset number of times.

28. A system for transfer as set forth in claim 20, wherein the reception side performs a detection operation of the header error control pattern in units of bits in which it deems a pre-boundary recognition state is entered when the header error control pattern is detected, a boundary recognition state is entered when that header error control pattern is detected successively a preset number of times, and a hunting state when that header error control pattern is not detected successively a preset number of times.

29. A system for transfer as set forth in claim 1, further comprising:

of an input apparatus at a user network interface (UNI) which inputs data from a network transferring variable length frames to a user, said input apparatus including a synchronization establishing operation unit which performs processing in bit units on data of successive variable length frames input from a transmission channel to detect constant length CRC patterns indicating the boundaries of n-octet units of transfer and deletes the CRC patterns when synchronization is established and a LMM frame separation unit which is comprised of an input buffer unit for temporarily holding data of each unit of transfer output from the synchronization establishing operation unit, a frame boundary discrimination control unit which detects a header error control pattern from the units of transfer to discriminate cell boundaries, and a LMM switch, having a switch for switching, in minimum units of transfer, variable length frames composed of an n-octet header and a LMM frame information field of a length of a whole multiple m ($m \geq 1$) of the minimum unit of transfer, using as the minimum unit of transfer a length of n ($8 \geq n \geq 6$) octets, the information field accommodating data generated from a higher layer adjusted to a length of a whole multiple of the minimum unit of transfer, and the header includes a multiple indicating the length of the variable length frame and, at an input side of the switch, an input buffer unit for receiving as input the variable length frames, a header analyzing unit for analyzing the headers, and a control unit, the header analyzing unit detecting the multiple indicating the length of the variable length frame, the control unit controlling the switch to set up a path from the input side to an output side of the switch for a time corresponding to the multiple of the minimum unit of transfer and transferring the data of the input buffer unit to the output side of said switch, a variable length frame switched by the LMM switch being input to a first sublayer control unit for controlling a lower layer in a LMM adaptation layer, the first sublayer-PDU information field being extracted and the extracted content being input to a convergence sublayer control unit for controlling a higher layer in the LMM adaptation layer, and the user information being extracted and transferred to the user.

30. A system for transfer as set forth in claim 1, further comprising:

an output apparatus of a user network interface (UNI) for outputting data from a user to a network transferring variable length frames, said output apparatus including a convergence sublayer control unit for converting the input from the user to a second sublayer protocol data unit (second sublayer-PDU), said second sublayer performing checking for errors in the data and verifying the correctness, a first sublayer control unit for converting to the first sublayer protocol data unit (first sublayer-PDU) containing the second sublayer-PDU as a whole, and a LMM frame multiplexing unit, including therein a switch unit, for multiplexing the first sublayer data unit after inserting a frame header and transferring the header via an output of the switch unit, said output corresponding to a frame destination address.

31. A system for transfer as set forth in claim 1, wherein a user network interface (UNI) connected with a network supporting the variable length frame assembles variable length frames of a header length of n-octets and an information field length of a fixed 48 octets when a connection is set up through a network supporting fixed length frames.

32. A system for transfer as set forth in claim 31, wherein a LMM layer in a network node interface (NNI) for connecting a network transferring variable length frames and a network supporting fixed length frames replaces the header of the frames from the network handling the variable length frames with a header of 5 octets and then outputs fixed length frames to the network supporting the fixed length frames.

33. A labeled multiplexing mode (LMM) switch for applying a switching operation to variable length frames, comprising:

a switch for switching, in minimum units of transfer, variable length frames composed of an n-octet header and a LMM frame information field of a length of a whole multiple m (m≧1) of the minimum unit of transfer, using as a minimum unit of transfer a length of n (8≧n≧6) octets (bytes), the information field accommodating data generated from a higher layer adjusted to a length of a whole multiple of the minimum unit of transfer, and the header includes a multiple indicating the length of the variable length frame and at an input side of the switch, an input buffer unit for receiving as input the variable length cells, a header analyzing unit for analyzing the headers, and a control unit, the header analyzing unit detecting the multiple indicating the length of the variable length frame together with routing information included in the header, the control unit controlling the switch to set up a path according to the routing information from the input side to the output side while segmenting frames corresponding to the multiple of the minimum unit of transfer and transferring the data of the input buffer unit to the output side of said switch.

34. A labeled multiplexing mode (LMM) exchange in which a LMM layer composes variable length LMM frames with an n-octet header and a LMM frame information field of a length of a whole multiple m (m≧1) of the minimum unit of transfer, using as a minimum unit of transfer a length of n (8≧n≧6) octets (bytes) and stores in the information field the information generated from a higher layer adjusted to a length of a whole multiple of the minimum unit of transfer and sets data in the frame header indicating the length of the variable length frame, said LMM exchange comprising:

a synchronization establishing operation unit for performing processing in bit units on the data of successive variable length frames input from a transmission channel to detect constant length patterns indicating boundaries of n-octet units of transfer and to delete the constant length patterns when synchronization is established and a LMM frame separation unit including an input buffer unit for temporarily holding data of each unit of transfer that is processed in the synchronization establishing operation unit, a frame boundary discrimination control unit which detects frame boundary discrimination patterns from the units of transfer to discriminate cell boundaries, and a LMM switch including a switch for switching, in minimum units of transfer, variable length frames composed of an n-octet header and a LMM frame information field of a length of a whole multiple m (m≧1) of the minimum unit of transfer, using as a minimum unit of transfer a length of n (8≧n≧6) octets, the information field accommodating data generated from a higher layer adjusted to a length of a whole multiple of the minimum unit of transfer, and the header includes a multiple indicating the length of the variable length frame and, at the input side of the switch, said input buffer unit for receiving as input the variable length frames, a header analyzing unit for analyzing the headers, and a control unit, the header analyzing unit detecting the multiple indicating the length of the variable length frame together with routing information, the control unit controlling the switch to set up a path from an input side to an output side of the switch for a time corresponding to the multiple of the minimum unit of transfer, and transferring the data of the input buffer unit to the output side, a variable length frame switched by the LMM switch being input to a first sublayer control unit in a LMM adaptation layer for controlling a lower layer, the first sublayer-PDU information field being extracted and the extracted content being input to a convergence sublayer control unit for controlling a higher layer in the LMM adaptation layer, and the user information being extracted and transferred to the user.

35. A labeled multiplexing mode (LMM) exchange as in claim 34, wherein said constant length patterns include cyclic redundancy checks (CRCs).

36. A labeled multiplexing mode (LMM) exchange as in claim 34, wherein said frame boundary discrimination patterns include header error controls (HECs).

\* \* \* \* \*